United States Patent [19]
Ishida et al.

[11] Patent Number: 5,852,593
[45] Date of Patent: Dec. 22, 1998

[54] REPRODUCTION APPARATUS AND METHOD FOR SUCCESSIVELY PLAYING BACK INFORMATION FROM A PLURALITY OF RECORDING MEDIA

[75] Inventors: Masayuki Ishida; Kazuhito Endo; Manabu Tsukamoto; Nobuaki Hirai; Yoshinobu Ishida, all of Nagaokakyo, Japan

[73] Assignee: Mitsubishi Denki Kabushiki Kaisha, Kyoto, Japan

[21] Appl. No.: 890,799

[22] Filed: Jul. 11, 1997

Related U.S. Application Data

[62] Division of Ser. No. 47,272, Apr. 19, 1993, Pat. No. 5,680,379.

[30] Foreign Application Priority Data

| Apr. 20, 1992 | [JP] | Japan | 4-99648 |
| May 6, 1992 | [JP] | Japan | 4-113474 |
| Jul. 3, 1992 | [JP] | Japan | 4-176901 |

[51] Int. Cl.⁶ .................................................. G11B 7/00
[52] U.S. Cl. ................................... 369/54; 369/124
[58] Field of Search ........................... 369/32–34, 44.25, 369/44.28, 47–48, 54, 58, 60, 124

[56] References Cited

U.S. PATENT DOCUMENTS

| 4,951,276 | 8/1990 | Sakaegi et al. | 369/58 |
| 4,959,825 | 9/1990 | Okano | 369/48 |
| 5,166,804 | 11/1992 | Takahashi | 369/50 X |
| 5,199,019 | 3/1993 | Matsumura et al. | 369/60 |
| 5,212,678 | 5/1993 | Roth et al. | 369/60 |
| 5,214,631 | 5/1993 | Maeda et al. | 369/59 |
| 5,235,575 | 8/1993 | Han | 369/32 |
| 5,243,587 | 9/1993 | Itoh et al. | 369/48 |
| 5,243,588 | 9/1993 | Maeda et al. | 369/54 |
| 5,289,439 | 2/1994 | Koulopoulos et al. | 369/32 |

FOREIGN PATENT DOCUMENTS

| 0463183 | 1/1992 | European Pat. Off. |
| 3-273586 | 12/1991 | Japan |
| 4-21985 | 1/1992 | Japan |
| 1407196 | 9/1975 | United Kingdom |

OTHER PUBLICATIONS

"Feature and View of a Mini–Disk (MD) System Developers Tell"; Radio Technic.; Dec. 1991; pp. 152–155.
"Features and Details of PASC Coding"; Radio Technic.; Dec. 1991; pp. 156–161.
"Mini Disk Realized through Magento–Optical Recording and Data Compression Techniques"; Nikkei Electronics; Dec. 9, 1991; pp. 160–168.

*Primary Examiner*—W. R. Young

[57] ABSTRACT

An information reproduction apparatus capable of reducing or eliminating the mute period when a pickup jumps during the reproduction or when a disk is changed in an information reproduction system provided with a disk changer mechanism for selecting one disk from plural disks, or when a disk is forced to change, or an information reproduction apparatus of displaying the time information corresponding to the actual outputting time of information from the output terminal by correcting the time information included in the information read from the recording medium or determined by the recording address, or an information reproduction system provided with a disk changer mechanism capable of checking the contents of other disks during reproduction, or system of reproducing only parts of information which allow to view the contents of all disks.

16 Claims, 22 Drawing Sheets

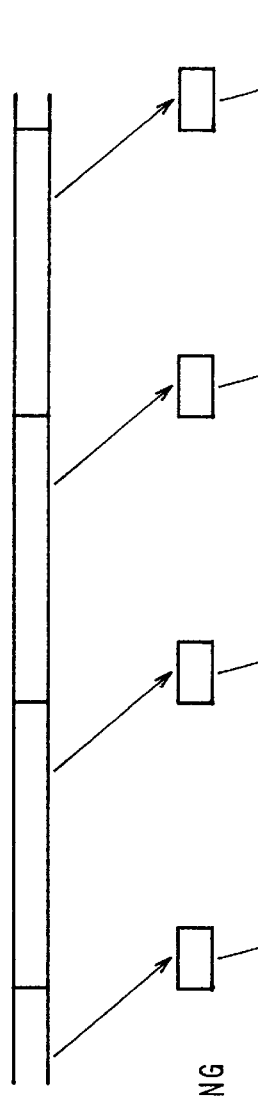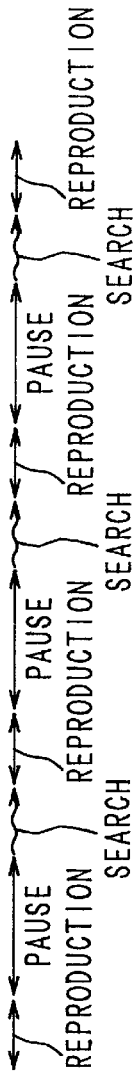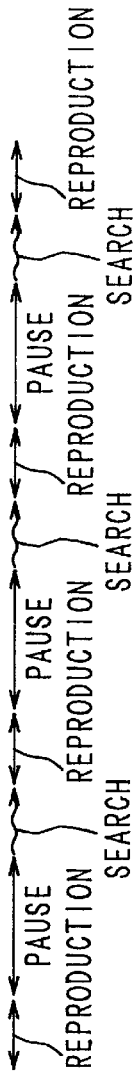
Fig. 2(a) Prior Art INPUT TO ENCODER
Fig. 2(b) Prior Art OUTPUT FROM RECORDING SIGNAL MEMORY
Fig. 2(c) Prior Art OUTPUT FROM RECORDING SIGNAL PROCESSING CIRCUIT
Fig. 2(d) Prior Art RECORDING STATE
Fig. 2(e) Prior Art REPRODUCTION STATE
Fig. 2(f) Prior Art REPRODUCED SIGNAL
Fig. 2(g) Prior Art INPUT TO BUFFER MEMORY

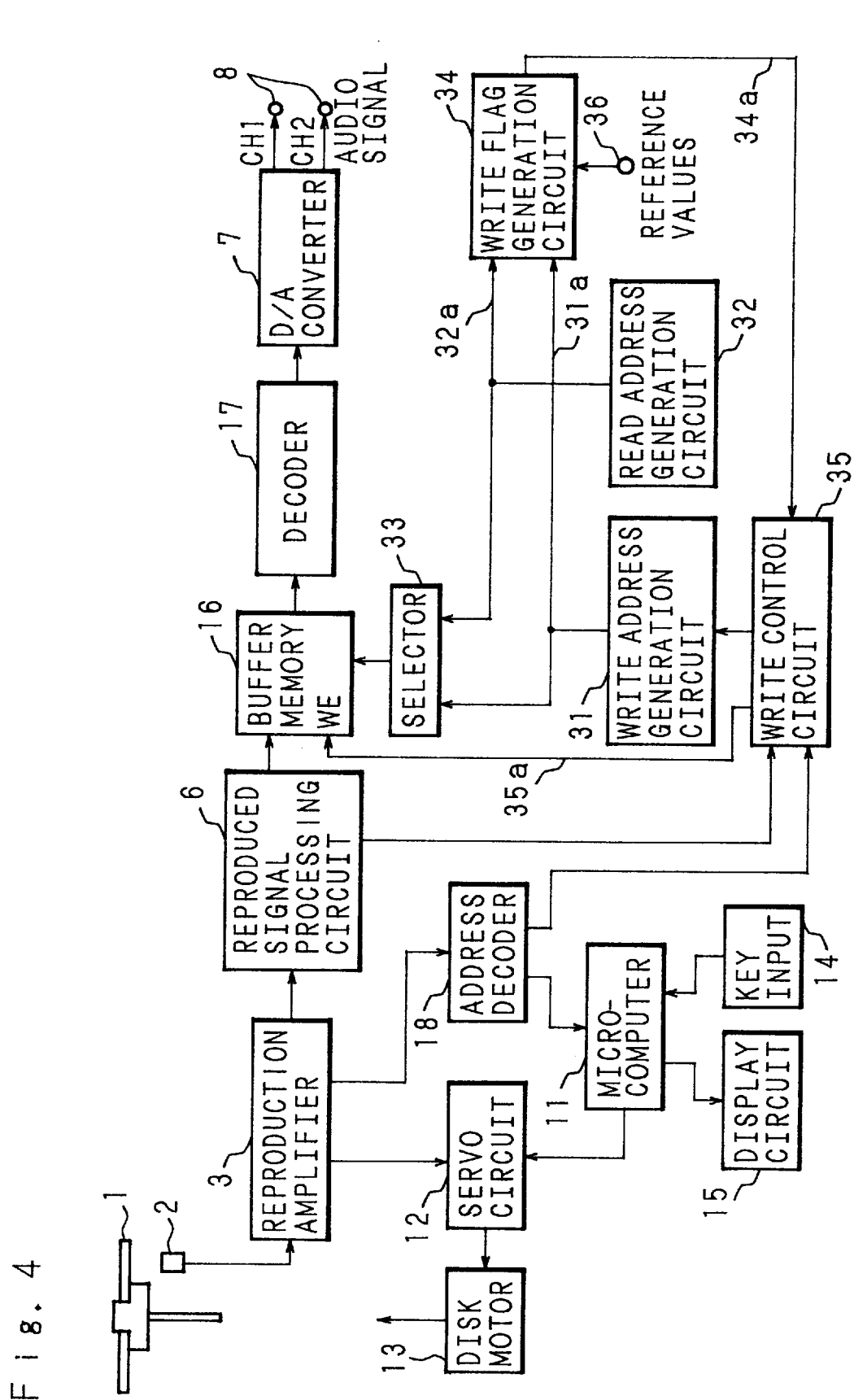

F I g. 5 ( a )    F I g. 5 ( b )
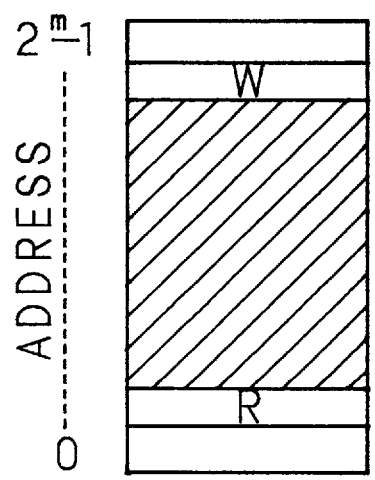
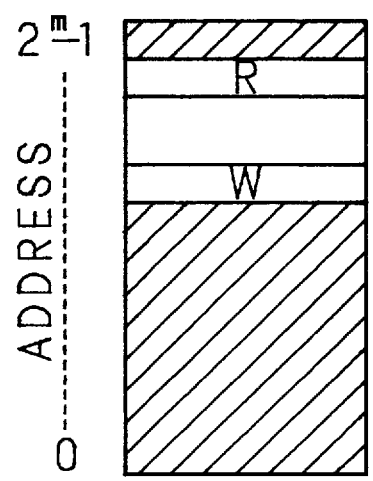

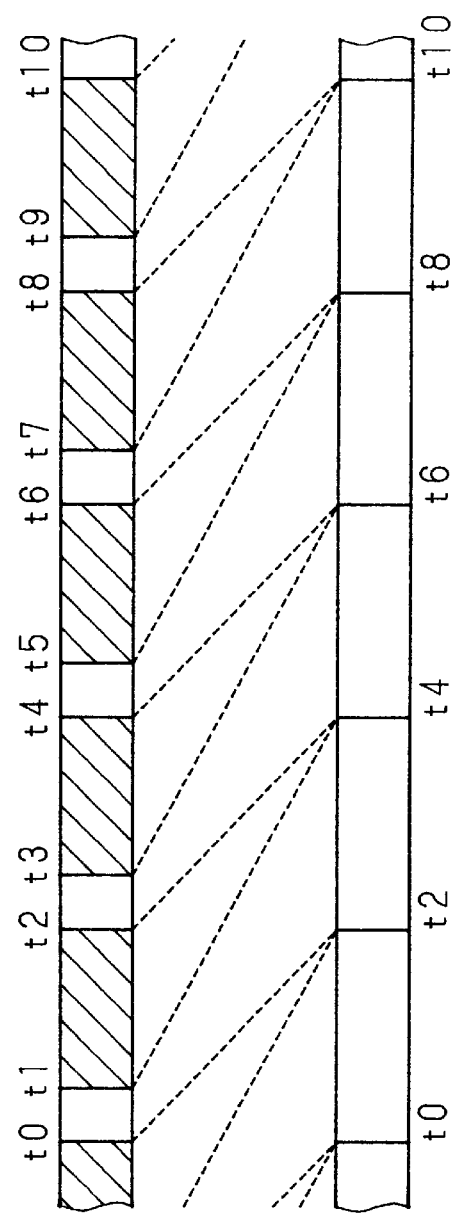
Fig. 13(a) WRITING DATA TO BUFFER MEMORY 16
Fig. 13(b) OUTPUT DATA FROM DECODER

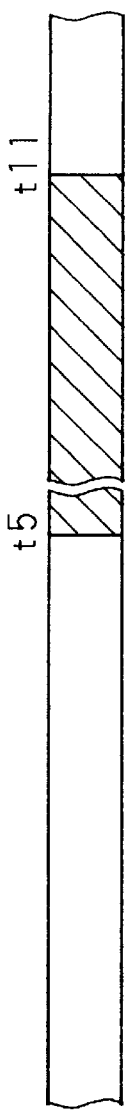
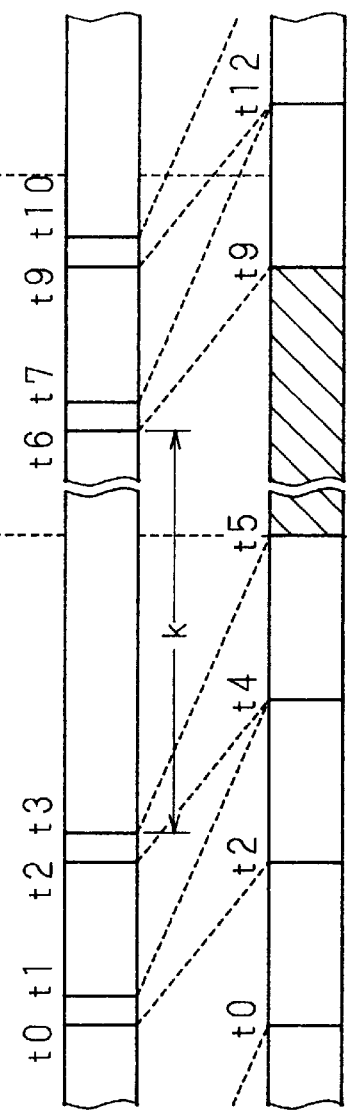
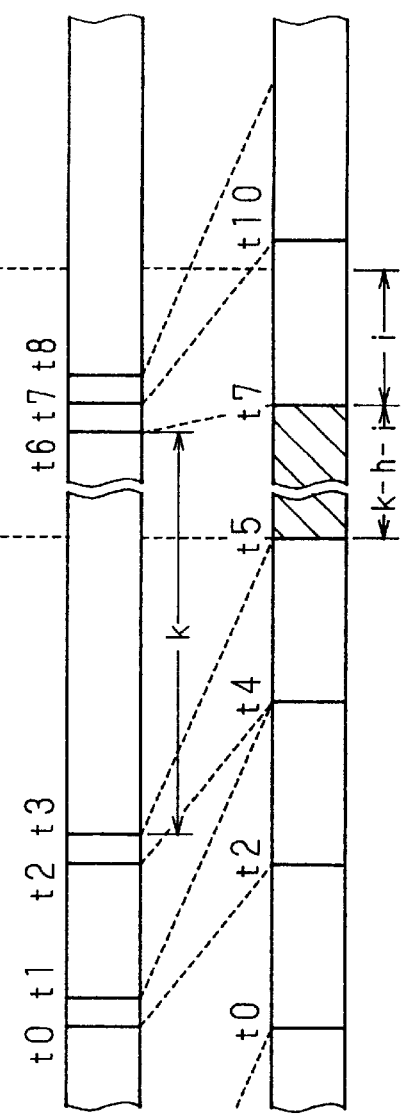
Fig. 14(a) REPRODUCTION OUTPUT FROM PRIOR ART CD SYSTEM
Fig. 14(b) DISK READ TIMING OF EMBODIMENT 2
Fig. 14(c) REPRODUCTION OUTPUT OF EMBODIMENT 2
Fig. 14(d) DISK READ TIMING OF EMBODIMENT 5
Fig. 14(e) REPRODUCTION OUTPUT OF EMBODIMENT 5

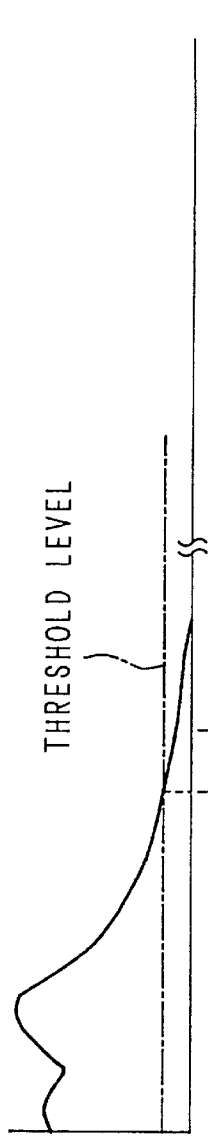
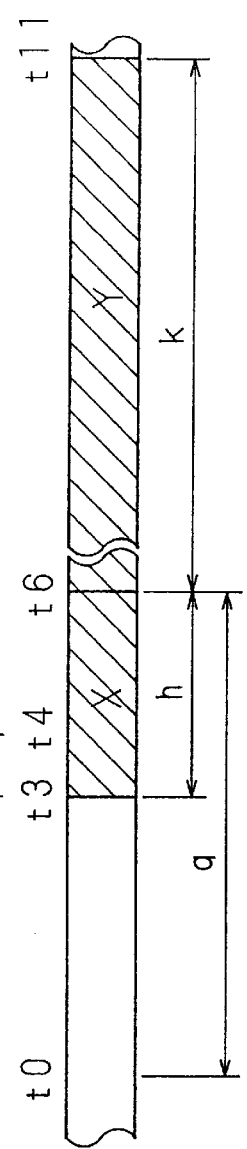
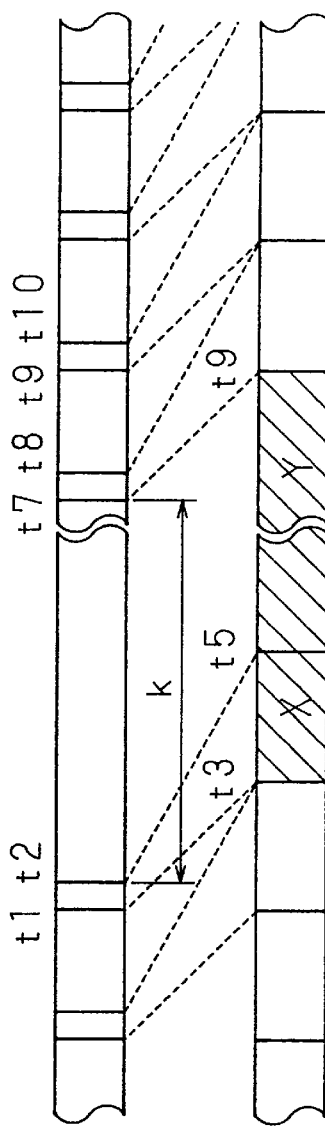
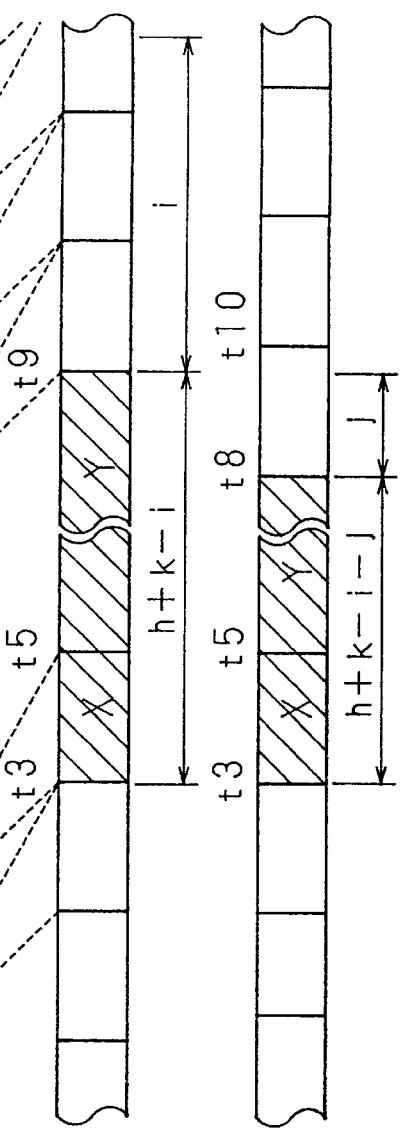
Fig. 16(a) REPRODUCTION SIGNAL LEVEL OF PRIOR ART CD SYSTEM
Fig. 16(b) REPRODUCTION OUTPUT FROM PRIOR ART CD SYSTEM
Fig. 16(c) DISK READ TIMING OF EMBODIMENT 6
Fig. 16(d) REPRODUCTION OUTPUT OF EMBODIMENT 6
Fig. 16(e) REPRODUCTION OUTPUT OF EMBODIMENT 7

REPRODUCTION APPARATUS AND METHOD FOR SUCCESSIVELY PLAYING BACK INFORMATION FROM A PLURALITY OF RECORDING MEDIA

This application is a divisional of application Ser. No. 08/047,272, filed on Apr. 19, 1993, now U.S. Pat. No. 5,680,379, the entire contents of which are hereby incorporated by reference.

BACKGROUND OF THE INVENTION

1. Field of the Invention

The present invention relates to an information reproduction apparatus used in reproducing information such as digital audio signals from disks.

2. Description of the Related Art

Digital audio equipment utilizing optical disks has been recently developed. As a system used exclusively for reproduction, the compact disk (referred to as CD hereafter) player is well known and, as a writable system, a write-once type is known. Further, magneto-optical disk systems which are capable of repeatedly recording without limitation have been under development. One of such systems is a mini disk (MD) system disclosed in "Nikkei Electronics" (pp.160–168, Dec. 9, 1991) in an article titled "Mini disk realized through magneto-optical recording and data compression techniques". The Mini disk thereinafter "MD") system records and reproduces compressed data of audio signals onto and from disks by means of a magneto-optical process. A disk of this system has guide grooves formed thereon for tracking control, while address information is recorded on the guide grooves continuously along the circumference of the disk. As a result, this system is capable of searching data regardless of whether there are signals recorded on the disk or not.

FIG. 1 shows a block circuit diagram of the MD system. In the drawing, numeral 101 denotes 2-channel audio input terminals, numeral 102 denotes an analog/digital converter (A/D), numeral 103 denotes an encoder, numeral 104 denotes a recording signal memory, numeral 105 denotes a recording signal processing circuit which adds error correction signals and modulates the signals, numeral 106 denotes a clock generator which generates and supplies clock signals needed by various circuits of the system, numeral 107 denotes a recording head actuator circuit, numeral 108 denotes a recording magnetic head, numeral 1 denotes a disk, numeral 2 denotes an optical pickup, numeral 3 denotes a reproduction amplifier, numeral 6 denotes a reproduced signal processing circuit which carries out demodulation and error correction, numeral 16 denotes a buffer memory, numeral 17 denotes a decoder, numeral 7 denotes a digital/analog (D/A) converter, numeral 8 denotes 2-channel audio output terminals, numeral 18 denotes an address decoder, numeral 11 denotes a microcomputer, numeral 12 denotes a servo circuit, numeral 13 denotes a disk motor, numeral 14 denotes key input and numeral 15 denotes a display circuit.

FIG. 2 shows a timing chart of a prior art signal processing during recording and reproduction. The operation will now be described with reference to FIG. 1 and FIG. 2.

When recording, analog audio signals supplied at the audio input terminals 101 are sampled in the A/D converter 102 and converted to digital signals. The digital audio signals are compressed and encoded in the encoder 103 to reduce the amount of information to about one fifth of the original.

Compressed signals are temporarily stored in the recording signal memory 104, and are intermittently read at the same rate as that before compression, as shown in FIG. 2(b). By reading the data intermittently, the difference between the rate of writing data into the memory and the rate of reading data from the memory is absorbed. The recording signal processing circuit 105 carries out an interleaving process (wherein the order of the signals is rearranged in order to disperse errors during reproduction) generates and adds error correction codes and modulates the signals. The modulated signals are magneto-optically recorded onto the disk 1 by the recording magnetic head 108 via the recording head actuator circuit 107. A recording operation is carried out according to the modulation signals (FIG. 2(c)) supplied intermittently, in such a manner that signal recording action and pause are repeated alternately as shown in FIG. 2(d), while searching the last address of the previously recorded signals prior to recording operation the and recording the signals consecutively following said last address.

When reproducing, a light beam is applied to the disk 1 by the optical pickup 2, and the signal recorded on the disk 1 is read by means of the reflected light. The optical information is converted to electric signals by the pickup 2 and supplied to the reproduction amplifier 3. Signals amplified by the reproduction amplifier 3 are sent to the reproduced signal processing circuit 6 where they are demodulated with such a method as EFM (Eight to Fourteen Modulation), processed for error detection and error correction, subjected to an interleaving process to recover the original order of signals, and then sent to the buffer memory 16.

On the other hand, output of the reproduction amplifier 3 is supplied also to the address decoder 18. The address decoder 18 has the purpose of retrieving the address information included in the guide groove of the light spot marked in advance on the disk 1, and reproduces the address signals which are continuously recorded along the circumference of the disk and obtains the tracking information by detecting the wobbling of the guide grooves. The tracking information is supplied to the servo circuit 12 wherein it is used for the purpose of tracking servo control so that the optical pickup 2 scans the specified guide grooves and the motor 13 is servo-controlled to maintain a constant linear velocity of the rotation of the disk 1, thereby making the guide grooves wobble at constant frequency.

Reading of the signals from the disk 1 is carried out intermittently similarly to writing of signals during recording. As shown in FIG. 2(e) and (f), reproducing action and pause are repeated alternately, while signals read from the buffer memory 16 are supplied to the decoder 17 and audio signals restored to the original amount of information before compression are converted to analog signals by the D/A converter 17 and then sent to the audio output terminals 8. The microcomputer 11 receives the address signals recorded in the disk guide grooves from the address decoder 18 and the address signals recorded corresponding to the audio signals, and controls the entire system upon reception of the key input 14 from the outside. The microcomputer 11 also drives the display circuit 15 to display such information as the system operation mode and elapsed time during reproduction.

In this system, signals are read from the disk 1 by the optical pickup 2 at a rate of about 1.4 Mbps. On the other hand, because the input rate of the decoder 17 is about 0.3 Mbps, the buffer memory 16 becomes full of data when signals are read from the disk for about 0.9 seconds if buffer memory 16 of 1M bits is used. Compressed data stored in the buffer memory 16 to the full capacity thereof sustains reproduction for about 3 seconds.

Thus even when the optical pickup 2 jumps due to an external disturbance, for example, it does not immediately cause interruption of sound reproduction because the buffer memory 16 holds the data. Accordingly, continuous reproduction without interruption can be carried out by searching the signals at the location immediately before the jump and writing the signals in the buffer memory 16 before the signals stored in the buffer memory 16 are consumed.

However, in the case that the pickup 2 comes off the track due to an impact while a small amount of data remains in the buffer memory 16 during reproduction, the data in the buffer memory 16 may be used up and the sound reproduction may be interrupted.

Further, because the data is delayed by being stored in the buffer memory 16, display of the address or time information reproduced by the pickup 2 becomes different from that corresponding to the outputting data from the terminals 8.

As an information reproduction apparatus to select one of a plurality of disks loaded on the apparatus and reproduce it, there is an onboard or stand-alone CD player equipped with a magazine-type disk changer. FIG. 3 shows a block circuit diagram of a conventional CD player equipped with a magazine-type disk changer. In the drawing, numeral 4 denotes a demodulation circuit, numeral 5 denotes a signal processing circuit, numeral 9 denotes a digital output circuit, numeral 10 denotes a digital audio output terminal and numeral 100 denotes a changing mechanism. Six to ten CD's are loaded on a magazine which is mounted on the changing mechanism 100 of the player. A CD specified by the user is picked out of the magazine and loaded on the disk mechanism (not shown in the drawing) and reproduced. Therefore, if the user makes a key operation for disk change to reproduce another disk when a disk is being reproduced, first the rotation of the disk currently reproduced is stopped and the disk is stored in the magazine, then another disk which has been specified is taken out of the magazine, loaded on the disk mechanism and is rotated to start the reproduction.

Changing a disk in an information reproduction apparatus equipped with such a changer system requires much time since operation as will be described below must be done after the reproduction of one disk is completed and before the next disk is reproduced.

1. Stop the disk rotation.
2. Store the disk which has been reproduced in the magazine.
3. Take out the disk to be reproduced next from the magazine.
4. Load the disk.
5. Rotate the disk.
6. Read the TOC (Table Of Contents) information.

Also since a CD usually includes a mute portion equivalent to two to three seconds following the end of the program, it takes about two or three seconds before starting the above operations after the program is completed, making the mute period during disk change longer.

As described above, because changing of the disk takes at least several seconds during which a mute state without reproduced sound continues, attempts have been made to increase the speed of the disk changing mechanism and reduce the mute period, but there has been a limitation to these attempts. An attempt to eliminate the mute period by utilizing a memory is disclosed in an unexamined publication of patent application No. H3-273586. In this apparatus, signals are read from a CD at a rate higher than the reproduction speed and stored in the memory from which signals are read at the specified reproduction rate. During the mute period of disk change, reading of signals stored in the memory is continued thereby substantially eliminating the mute period.

In such an apparatus, a mute period can be eliminated or reduced when a plurality of Cd's are reproduced in the predetermined order and in the pre-determined order of music pieces in each CD, although it has no effect of reducing the mute period in case the user forcibly commands disk change during reproduction because the necessary signals are not stored in the memory.

SUMMARY OF THE INVENTION

The present invention has been conceived in order to solve the problems described above. A first object of the invention is to provide an information reproduction apparatus capable of reducing or eliminating the mute period when the pickup jumps during reproduction, when changing the disk in the information reproduction system equipped with a disk changer mechanism which selects one disk from a plurality of disks and reproduces information from the selected disk, or when the disk is changed forcibly.

A second object of the invention is to provide an information reproduction apparatus capable of displaying the time information determined by the time information included in the reproduced information or determined by the address, by correcting the information and obtaining time information which corresponds to the actual output time when the information is provided at the output terminal.

A third object of the invention is to provide an information reproduction apparatus capable of checking the contents of other disks during reproduction of a disk in an information reproduction system equipped with a disk changer mechanism which selects one disk from a plurality of disks and reproduces information from the selected disk, or to provide an information reproduction apparatus capable of checking the contents of disks and collectively reproducing part of information thereof.

The above and further objects and features of the invention will more fully be apparent from the following detailed description and accompanying drawings.

BRIEF DESCRIPTION OF THE DRAWINGS

FIG. 2(*a*) shows a timing chart of an input to an encoder of an the conventional MD system;

FIG. 2(*b*) shows a timing chart of an output of a recording signal memory of the conventional MD system;

FIG. 2(*c*) shows a timing chart of output of a recording signal processing circuit of the conventional MD system;

FIG. 2(*d*) shows a timing chart of the recording status of the conventional MD system;

FIG. 2(*e*) shows a timing chart of the reproduction status of the conventional MD system;

FIG. 2(*f*) shows a timing chart of reproduced signal of the conventional MD system;

FIG. 2(*g*) shows a timing chart of input to a buffer memory of the conventional MD system;

FIG. 4 shows a block circuit diagram of Embodiment 1 of the information reproduction apparatus of the invention;

FIG. 5(a) is a schematic drawing of data storage in the buffer memory of Embodiment 1;

FIG. 5(b) is a schematic drawing of data storage in the buffer memory of Embodiment 1;

FIG. 13(a) shows a timing chart of writing data in buffer memory of the information reproduction apparatus of Embodiment 5;

FIG. 13(b) shows a timing chart of output data from the decoder of the information reproduction apparatus of Embodiment 5;

FIG. 14(a) shows a timing chart of reproduction output in the CD system of the prior art;

FIG. 14(b) shows a timing chart of reading data from disk in Embodiment 2;

FIG. 14(c) shows a timing chart of reproduction output in Embodiment 2;

FIG. 14(d) shows a timing chart of reading data from disk in Embodiment 5;

FIG. 14(e) shows a timing chart of reproduction output in Embodiment 5;

FIG. 16(a) shows a graph illustrative of the change in reproduced signal level with time of the CD system of a prior art.

FIG. 16(b) shows a timing chart of a reproduction output in the CD system of the prior art;

FIG. 16(c) shows a timing chart of reading data from a disk in Embodiment 6;

FIG. 16(d) shows a timing chart of a reproduction output in Embodiment 6;

FIG. 16(e) shows a timing chart of a reproduction output in Embodiment 7;

DESCRIPTION OF THE PREFERRED EMBODIMENTS

Embodiment 1

Figure 1:
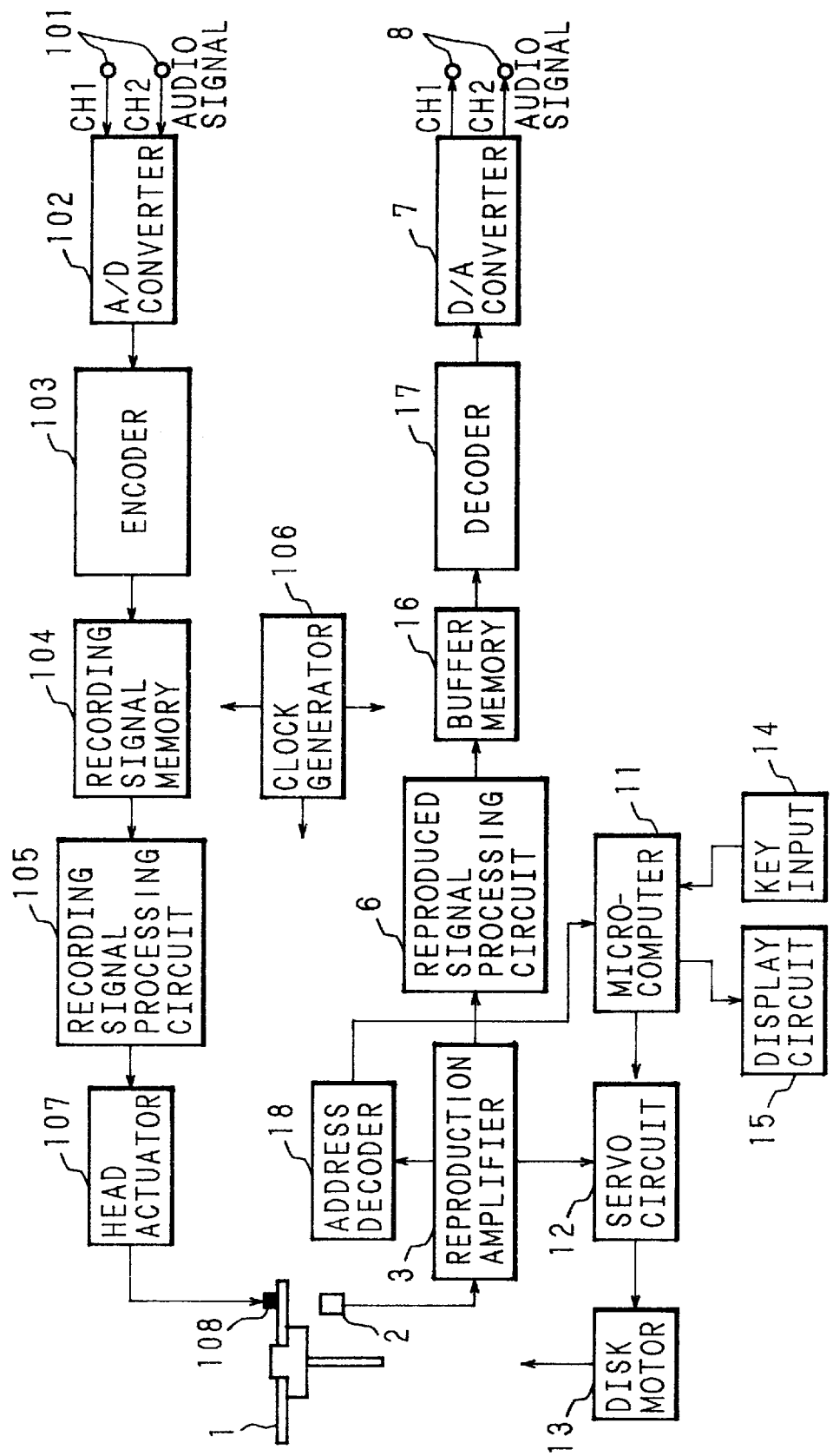
FIG. 1 shows a block circuit diagram of a conventional MD system.

The information reproduction apparatus of the invention will now be described below with reference to the attached drawings. Portions identical or equivalent to those in the prior art are assigned identical numerals and will not be explained. FIG. 4 shows a block circuit diagram of Embodiment 4, wherein the recording section is omitted and with only the reproduction section being indicated. In the drawing, numeral 16 denotes a buffer memory, numeral 31 denotes a circuit generating the address of writing in buffer memory 16, numeral 32 denotes a circuit generating the address of reading data from buffer memory 16, numeral 33 denotes a selector, numeral 34 denotes a write flag generator circuit wherein write flag is generated from the difference between the read address 32a and write address 31a and the reference value received on an input terminal 36. Numeral 35 denotes a write control circuit which controls writing into the buffer memory 16 by regulating the clock signal supplied to the write address generator circuit 31 and the write pulse 35a to the memory 16.

FIG. 5 shows a memory map illustrative of the relationship between the amount of data stored in the buffer memory having m-bit address and the write and read addresses, wherein W denotes data being written and R denotes data being read. The write address and the read address change cyclically from 0 to $2^{m-1}$ where $2^m$ is the capacity of the buffer memory while counting up. FIG. 5(a) shows a case wherein the write address is greater than the read address, with the hatched portion indicating the amount of data stored in the memory 16 and showing that the larger the area of the hatched portion is, the longer the time of outputting data from memory 16 after stopping the writing operation becomes. FIG. 5(b) shows a case wherein the address has increased over that in FIG. 5(a), with the address of W returning to 0 and the address of R has become greater than W by counting up further.

The operation of the invention will be described below. Data with errors being corrected in the reproduced signal processing circuit 6 is intermittently written in the memory 16 according to the write address generated in the write address generation circuit 31. The writing operation is carried out at a rate of 1.4 Mbps. On the other hand, data stored in the memory 16 is continuously read at a rate of 0.3 Mbps according to the address generated in the read address generation circuit 32. The write flag generation circuit 34 calculates the amount of data remaining in the buffer memory 16 from the difference between the write address 31a and the read address 32a and, when the calculated amount of data is below the first reference value E which has been input from the terminal 36, sets the write flag to 0 (write enable) and, when the calculated amount of data is greater than the maximum value of address $2^m$ or greater than the second reference value F which has been selected in advance from values less than $2^m-1$ in the vicinity of $2^m-1$, sets the write flag to 1 (write disable).

The write control circuit 35 controls the write address generation circuit 31 to generate an address for writing the data reproduced from the disk 1 in the memory 16 and sends a write pulse 35a to the buffer memory 16, when the write flag is 0. When the write flag is 1, the write control circuit 35 stops the supply of clock signals to the write address generation circuit 31 to prevent the write address from being updated and stops the supply of write clock signals to the memory 16.

Thus data is written in the memory 16 when the amount of data stored in the buffer memory 16 decreases below the first reference value E, and writing is disabled until the amount of data in the memory 16 decreases to the level E when the amount of data stored in the buffer memory 16 increases up to the second reference value F which indicates the amount of data in the buffer memory 16 near overflow.

Figure 6A:
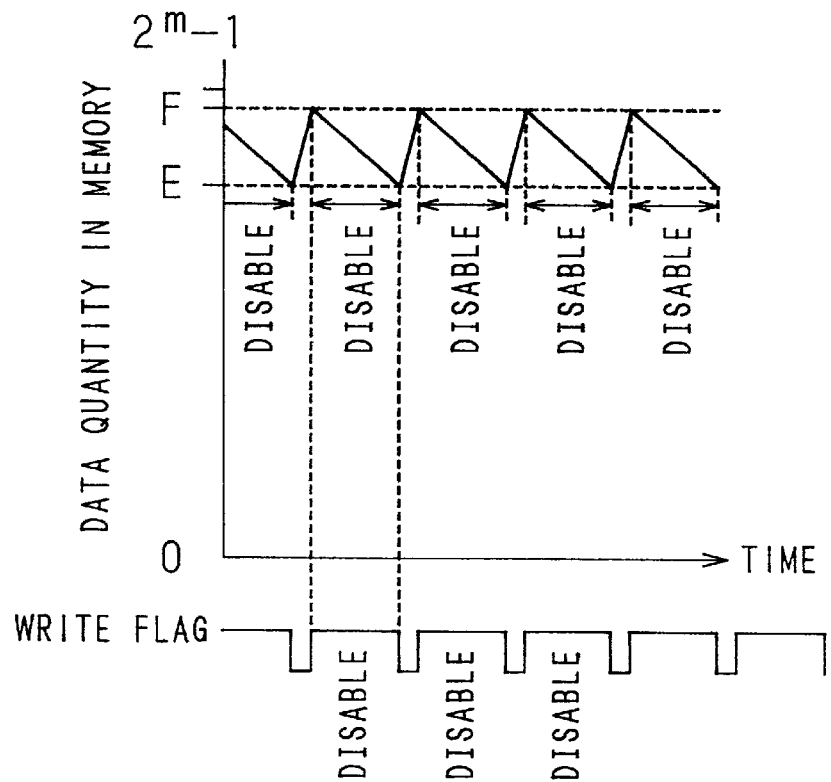
FIG. 6(a) shows a graph illustrative of the change in the amount of data when large values are set for the amount of data stored in the buffer memory and reference value E in Embodiment 1.
Figure 6B:
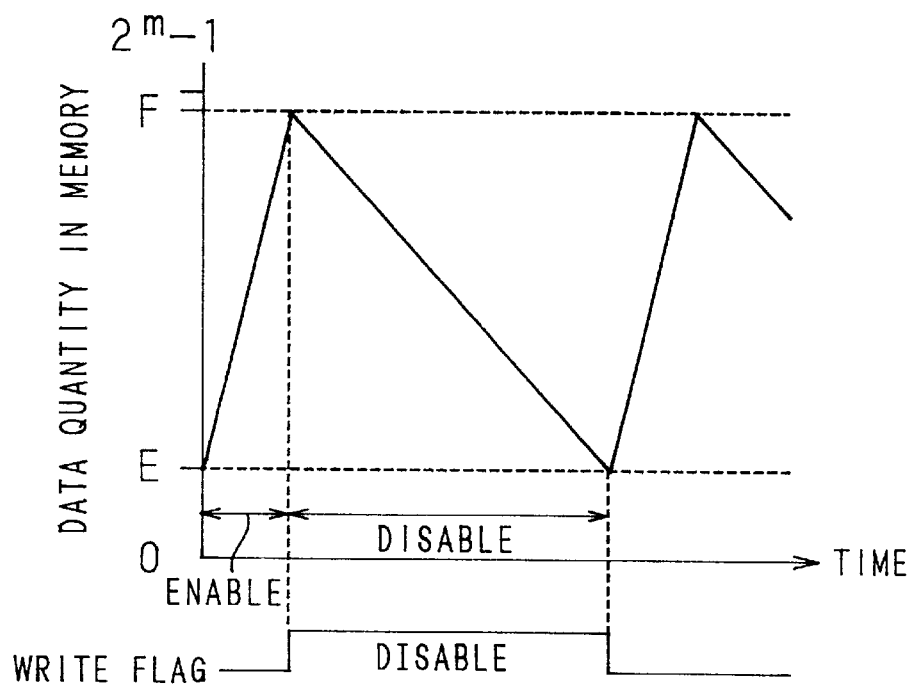
FIG. 6(b) shows a graph illustrative of the change in the amount of data when small values are set for the amount of data stored in the buffer memory and reference value E in Embodiment 1.

FIG. 6 shows graphs illustrative of the changes in the amount of data stored in the buffer memory 16, wherein time is plotted as an abscissa and the amount of data in the buffer memory 16 is plotted as an ordinate. FIG. 6(a) shows a case of setting a large value for the first reference value E and FIG. 6(b) shows a case of setting a small value for the first reference value E. Setting as shown in FIG. 6(a) is advantageous in countering vibration because a sufficient amount of data is always stored in the memory 16. Setting as shown in FIG. 6(b) provides long write-disabled periods and enables one to utilize the write-disabled periods in reproduction for other tasks. The first reference value E is determined by using the terminals 36 in accordance to the application.

In case the optical pickup 2 comes off track, the address decoder 18 detects the deviation and sends a signal to notify the deviation to the write control circuit 35. In case of an off-track error, the write control circuit 35 disables writing until a normal address is restored even when the amount of data in the memory 16 decreases below E.

Figure 7:
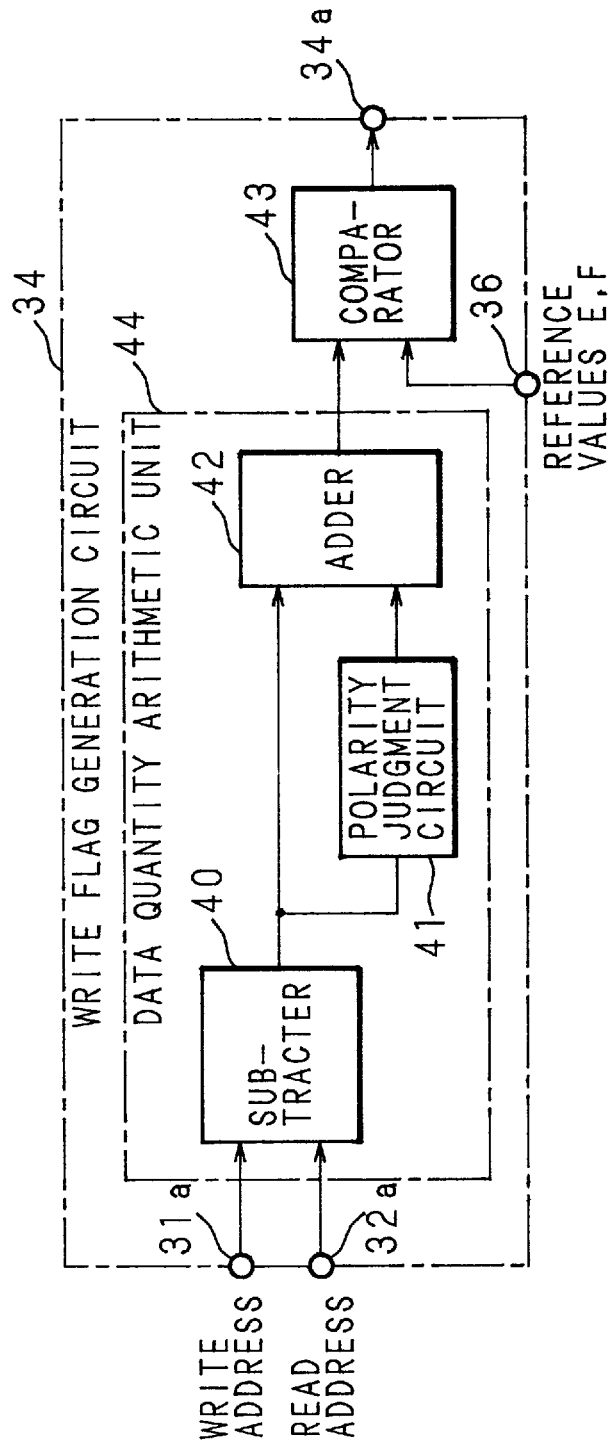
FIG. 7 shows a block circuit diagram of write flag generation circuit of Embodiment 1.

FIG. 7 shows a block circuit diagram illustrative of an example of the construction of the write flag generation circuit 34. Numeral 40 denotes a subtracter which subtracts the value of read address 32a from the value of write address 31a. Numeral 41 denotes a polarity judgment circuit which senses the polarity of output from the subtracter 40 and provides an output of 0 when the polarity is plus, or provides an output of $2^m$ when the polarity is minus. Numeral 42 denotes an adder. Numeral 43 denotes a comparator which determines whether the output from the adder 42 is greater or less than the reference value. The subtracter 40, the polarity judgment circuit 41 and the adder 42 constitute an arithmetic unit 44 which calculates the amount of data remaining in the buffer memory 16.

In the case of FIG. 5(a), output of the adder 42 is the same as the output of the subtracter 40 because the output of the subtracter 40 is positive. In the case of FIG. 5(b), the adder 42 adds $2^m$ to the value of subtracter 40 and provides it as the output because the output of the subtracter 40 is negative. Data remaining in the memory portion indicated by the hatched area in FIG. 5 is thus taken out as positive values by the polarity judgment circuit 41. The comparator 43 gives an output of 1 when the output of the adder 42 is less than the first reference value E, and gives an output of 0 when the second reference value F (which is set near the maximum memory capacity $2^m$) is reached to prevent overflow of the memory 16, so that the write control circuit 35 disables writing.

Embodiment 2

Figure 8:
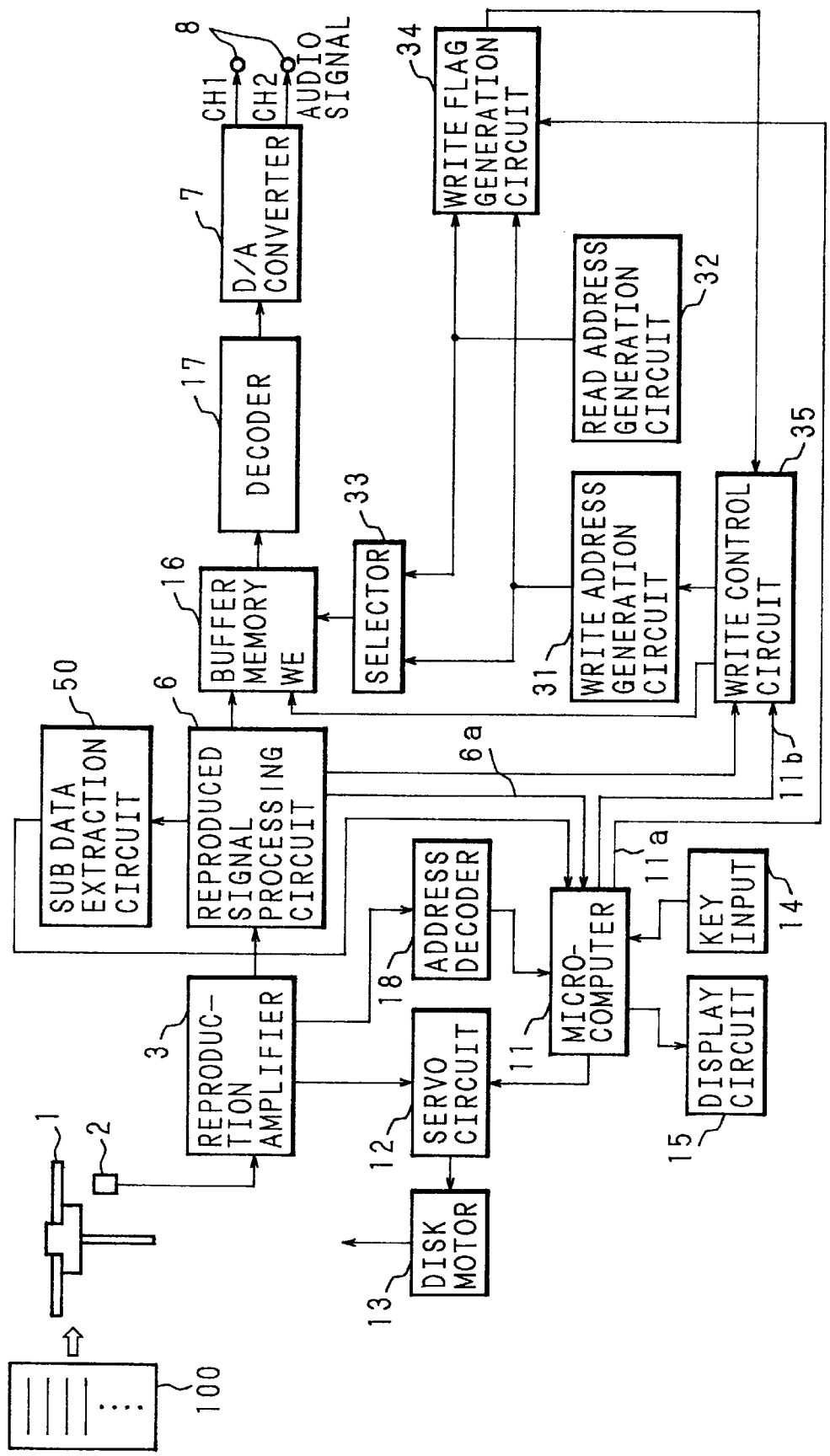
FIG. 8 shows a block circuit diagram of Embodiment 2 of the information reproduction apparatus of the invention.

FIG. 8 shows a block circuit diagram illustrative of Embodiment 2 of the information reproduction apparatus of the invention. In FIG. 8, numeral 50 denotes a sub data extraction circuit which extracts information representing the position on the disk or the time information representing the elapsed reproduction time from the reproduced signals. This embodiment relates to a system equipped with a magazine type disk changer which accommodates a plurality of disks 1 capable of continuously reproducing all disks or reproducing selected programs. While the disk changer system continues the reproduction by automatically replacing the disk which has been completed with the next disk, this disk changing operation results in a mute period of 10 to 15 seconds.

When a RAM with a capacity of 1M bits is used for the buffer memory 16, compressed signals equivalent to 3 seconds in terms of reproduction time can be stored in case of an MD system, and therefore compressed signals equivalent to 12 seconds can be stored in a memory of 4M bits. Embodiment 2 reduces the mute period during disk change by utilizing this capability.

Now the operation will be described below.

Continuous reproduction or programmed reproduction is selected by key input 14 and, in the case of programmed reproduction, disk No. and channel No. of the music piece to be reproduced are also designated. Data of these designations is stored in the internal memory (not shown) of the microcomputer 11 which determines whether the last music piece to be reproduced in the disk currently reproduced has been completed or not based on the address indicating the position on the disk or the time information extracted by the sub information extraction circuit 50. The last piece of music refers to the piece of music at the end of a disk in the case of continuous reproduction or the music piece programmed at the end of the programmed sequence of the music pieces of the disk in the case of programmed reproduction. Start position, end position and time information of each music piece can be obtained by reading the TOC (Table of Contents) recorded in a portion of the disk.

The microcomputer 11, when it determines that a music piece is completed, turns the write stop signal 11b to stop mode and sends it to the write control circuit 35 to prohibit writing of reproduced signals in the memory 16. When writing is prohibited, write address is not updated and write clock signals to the memory 16 are not supplied.

Then when the disk 1 is changed and demodulated signals are normally reproduced, demodulation OK signal 6a is delivered from the reproduced signal processing circuit 6. The microcomputer 11, when it detects this signal, turns the write stop signal 11b to the release mode. The write control circuit 35 writes the music pieces of the new disk 1 in the buffer memory 16 while updating the address, so that the last music piece of the previous disk 1 and the first music piece of the new disk 1 are stored in the buffer memory 16 substantially adjacent one another, thereby reducing the mute period during disk change.

The length of time absorbed by the delay of the output with respect to the input to the buffer memory 16 can be freely selected by changing the capacity 2 of the buffer memory 16. However, if a memory of excessively large capacity is used, length of time being absorbed becomes too long to cause sound to be produced even after the reproduction is stopped in case only one disk is reproduced, resulting in an unnatural feeling. Therefore, when a memory of large capacity is used, it is preferable to store large amount of data in the memory 16 by setting a value of the first reference E as shown in FIG. 6(a) only when the system is programmed to reproduce the next disk. When listening to the sound with the system being placed in another room, the first reference value E may be set always at a high level.

Embodiment 3

Figure 9:
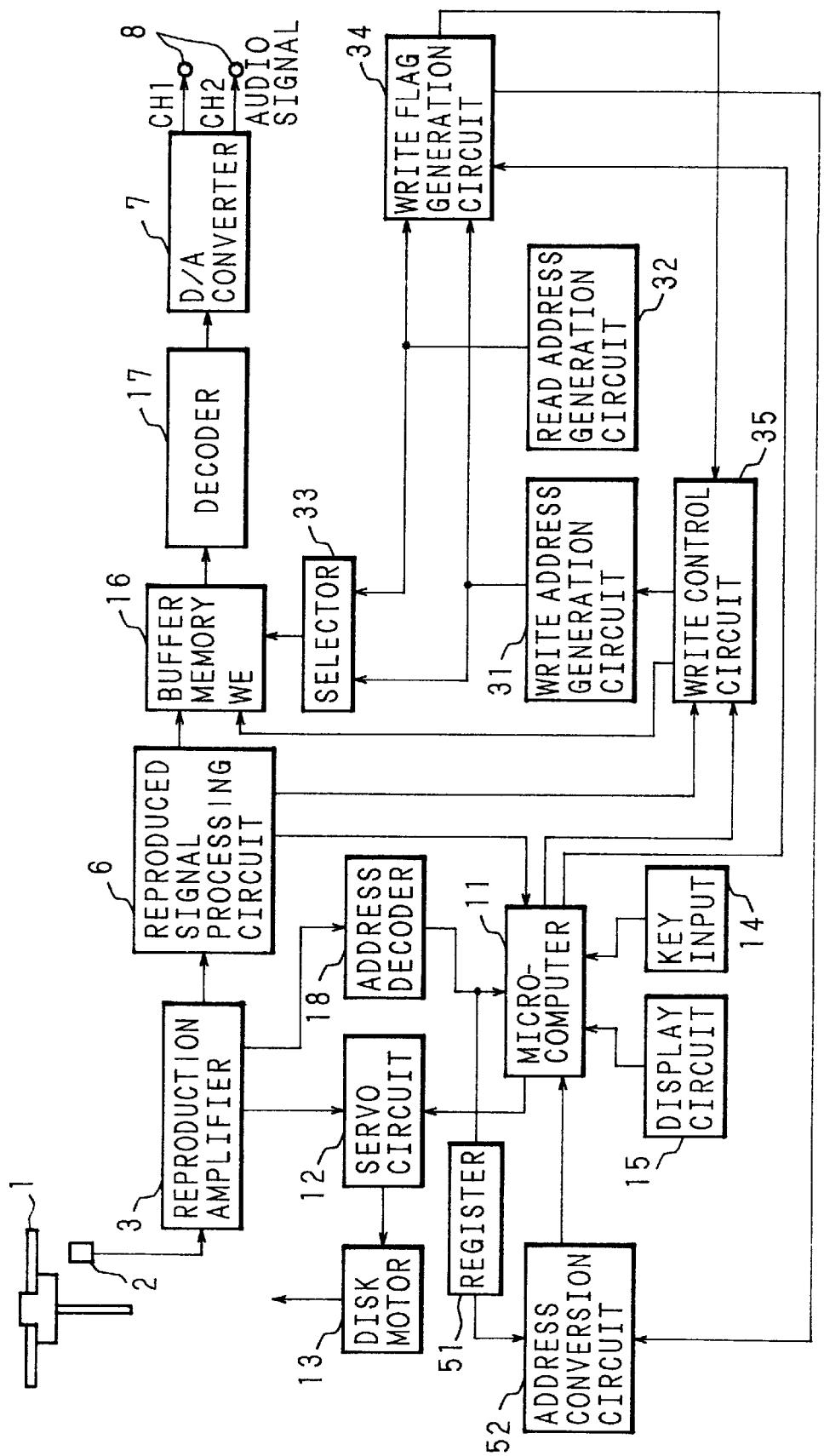
FIG. 9 shows a block circuit diagram of Embodiment 3 of the information reproduction apparatus of the invention.

FIG. 9 shows a block circuit diagram of Embodiment 3 of the information reproduction apparatus of the invention. Numeral 51 denotes a register used to hold the output from the address decoder 18. Numeral 52 denotes an address conversion circuit which corrects the output from the register 51 by using the output from the arithmetic unit 44 (see FIG. 7) which constitutes the write flag generation circuit 34.

As described so far, delay time in the buffer memory 16 increases as larger capacity is used for the buffer memory 16. Consequently when address data extracted by the address decoder 18 is converted to time data by the microcomputer 11 and is displayed, disparity between the music piece provided at the output terminal 17 and the time information increases. For example, when up to 12 seconds of delay is caused with a memory of 4M bits being used, output of the second music piece begins to be given at the terminal 8 at the time when the display shows that 12 seconds have passed after the program has changed to the second music piece.

This embodiment eliminates such inconveniences. The register 51 latches the address provided by the address decoder 18. While the value of the register 51 is updated during writing into the buffer memory 16, it is not updated when writing is disabled. Therefore the address held by the register 51 is the latest of data which has been written in the buffer memory 16, and can be said to correspond to the position information of the data stored at the address designated by the write address.

On the other hand, output from the arithmetic unit 44 of the write flag generation circuit 34 is the difference between the read address and the write address. This data is converted by the address conversion circuit 52 to the difference of address on disk 1. This conversion can be calculated easily because the amount of data included in one address is constant. Then the address conversion circuit 52 subtracts the address difference obtained from the address held by the register 51 and sends the result to the microcomputer 11 which converts the data to time and displays it. Because the address provided by the address conversion circuit 52 corresponds to the address of the data read from the buffer memory 16, there occurs no disparity between the actual elapsed time of reproduction of the current music piece and the displayed time.

Delay time in the reproduced signal processing circuit 6 and in the decoder 17 is usually negligible, and therefore correction of only the delay time in the buffer memory 16 may suffice. When time information is to be obtained from the address reproduced from the disk 1, the microcomputer 11 converts it to time information and displays it.

While output from the sub data extraction circuit 50 is used in determining the end of a music piece in Embodiment 2, similar effect can be obtained by using the output from the address decoder 18.

While output from the address decoder 18 is used to correct the address in Embodiment 3(a), similar effect can be obtained by installing the sub information extraction circuit 50 of FIG. 8 and using the output therefrom.

While the second reference value F is fixed in the above embodiments, such an arrangement that allows one to freely set the second reference value F similarly to the first reference value E may also be employed.

While examples are given for audio signals in the above embodiments, similar effects can be obtained with an apparatus for reproducing digital signals.

Embodiment 4

Figure 3:
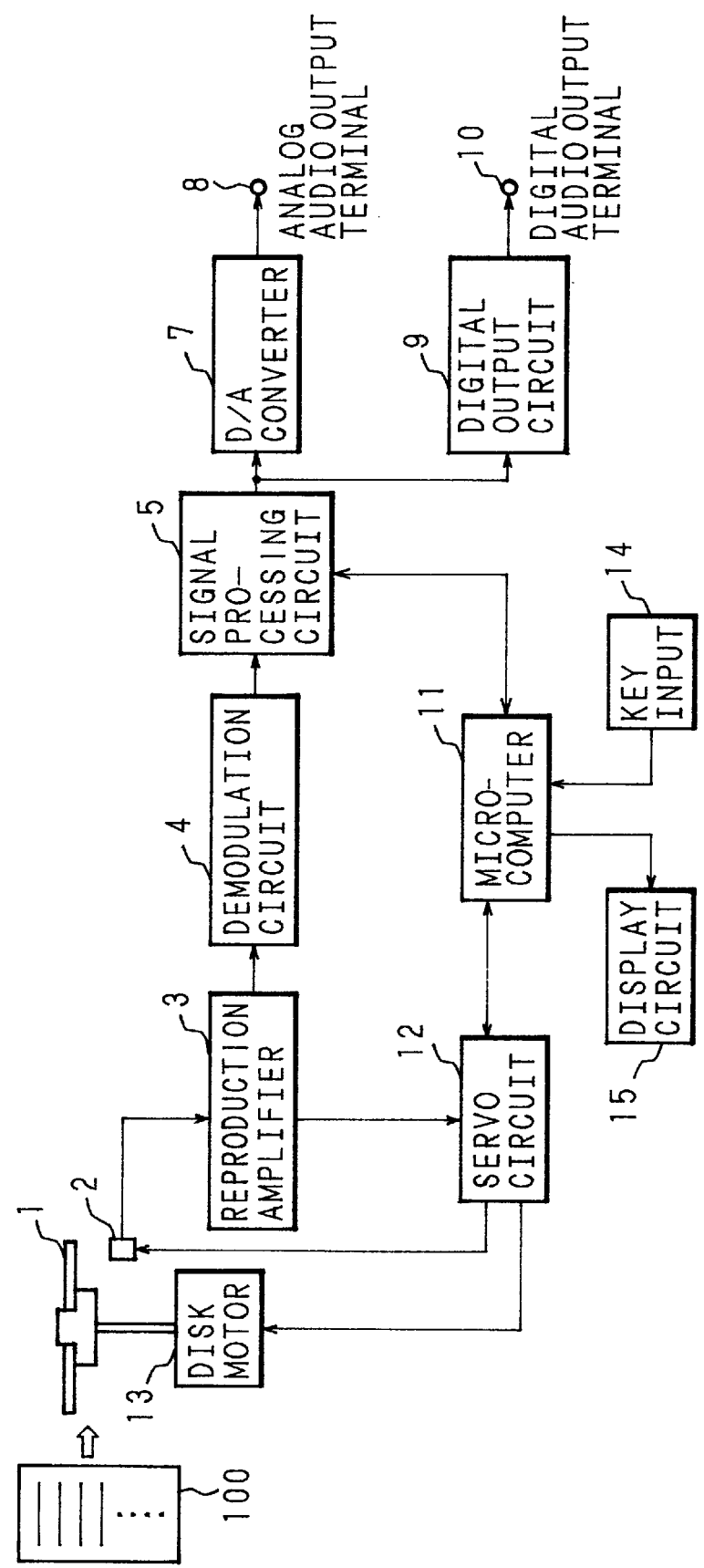
FIG. 3 shows a block circuit diagram of a CD player equipped with a magazine-type disk changer of the prior art.
Figure 10:
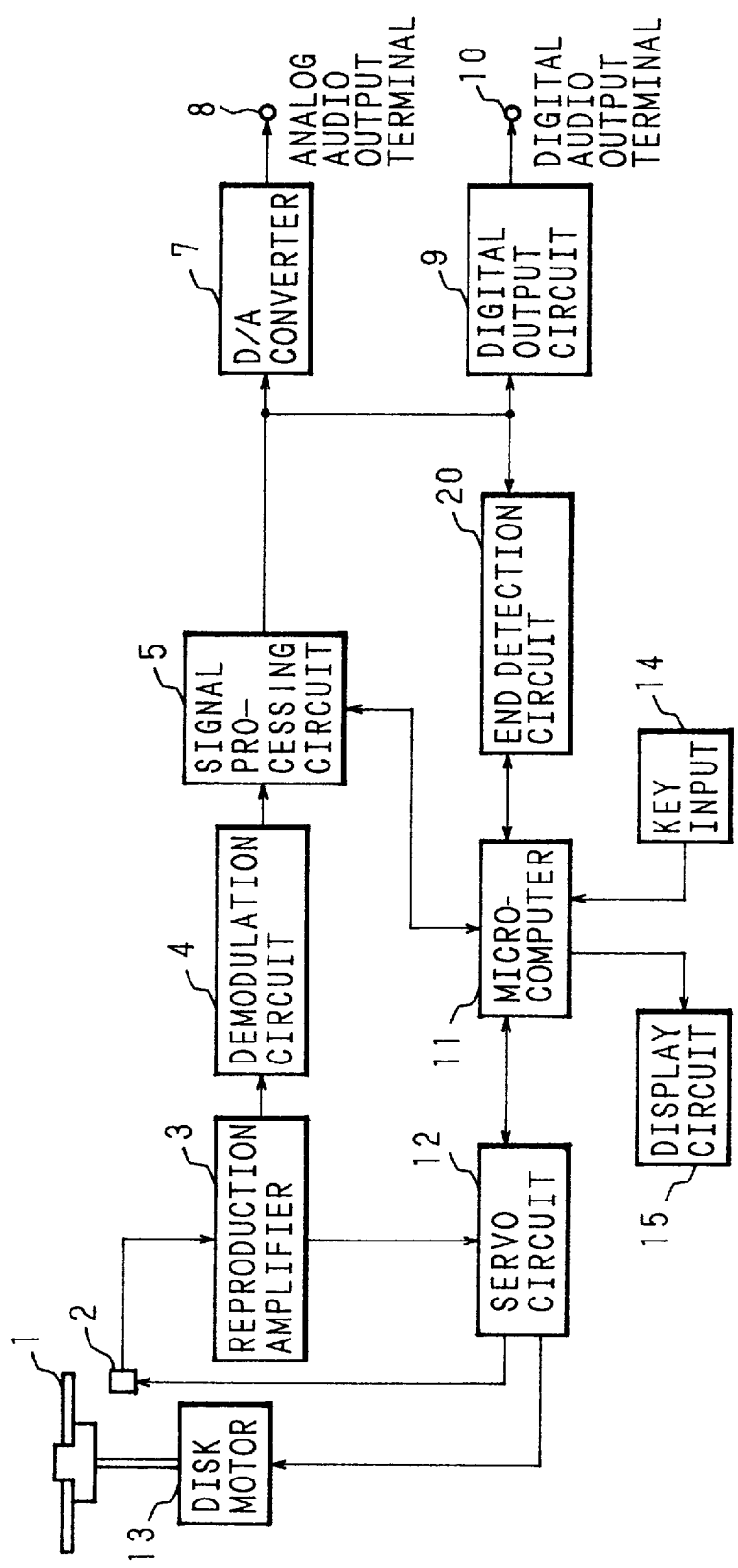
FIG. 10 shows a block circuit diagram of Embodiment 4 of the information reproduction apparatus of the invention.

FIG. 10 is a drawing illustrative of the construction of Embodiment 4 of the information reproduction apparatus according to the invention. In FIG. 10, numerals 1 through 5 and 7 through 15 denote components identical with those of the prior art shown in FIG. 3, and therefore description thereof will be omitted. Numeral 20 denotes an end detection circuit which detects the end of program stored in a disk currently being reproduced.

In this embodiment, time series of digital audio signals restored into the original signals by the signal processing circuit 5 are supplied to the end detection circuit 20. The end detection circuit 20 determines that the program has come to its end when the reproduced signal level decreases below the specified level before the end time of the program on a disk.

Figures 11A, 11B, 11C:
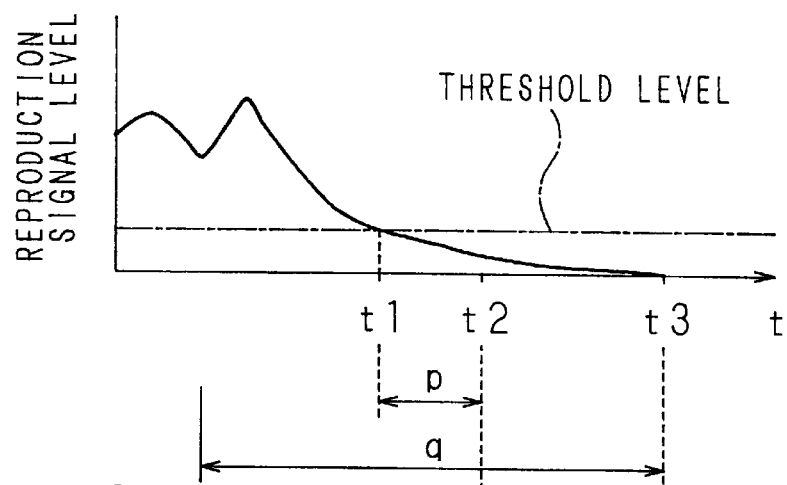
FIG. 11(a) shows a graph illustrative of the change in reproduced signal level with time.
FIG. 11(b) shows a timing chart of disk rotation and pause in the information reproduction apparatus of the prior art.
FIG. 11(c) shows a timing chart of disk rotation and pause in the information reproduction apparatus of Embodiment 4.

FIG. 11 shows a timing chart when the end a program is detected. In FIG. 11(a) shows the reproduced signal level, 11(b) shows the operation mode of a CD system of the prior art and 11(c) shows the operation mode of Embodiment 4.

It is already known from the reproduction time of a music piece recorded in the TOC information of a CD that the program will end at time t3, and a CD system of the prior art ends the reproduction of the program at time t3 stopping the disk 1 at this time. However, in an embodiment of the invention, the end detection circuit 20 monitors the reproduced signal level during specified period of q seconds before the program end time t3 and, in case no sound is produced or signals below the threshold level continue for the specified period of p seconds (p<q), it is determined that no sound will be produced in the remaining period from t2 to t3 and reading from the disk 1 is interrupted at t2, thereupon rotation of the disk 1 is immediately stopped.

With such a scheme as described above, it is made possible to reduce the time before stopping the disk 1 by s seconds. If this scheme is applied to a system which automatically changes a plurality of disks, the period without sound (i.e. the mute period) during disk change can be reduced and therefore the period of time before starting the reproduction of the next disk after ending the reproduction of the present disk can be reduced.

Embodiment 5

Embodiment 5 further reduces the mute period during disk change by utilizing buffer memory of an MD system which temporarily stores compressed information which has been reproduced in the buffer memory and outputs it after decoding thereof.

Figure 12:
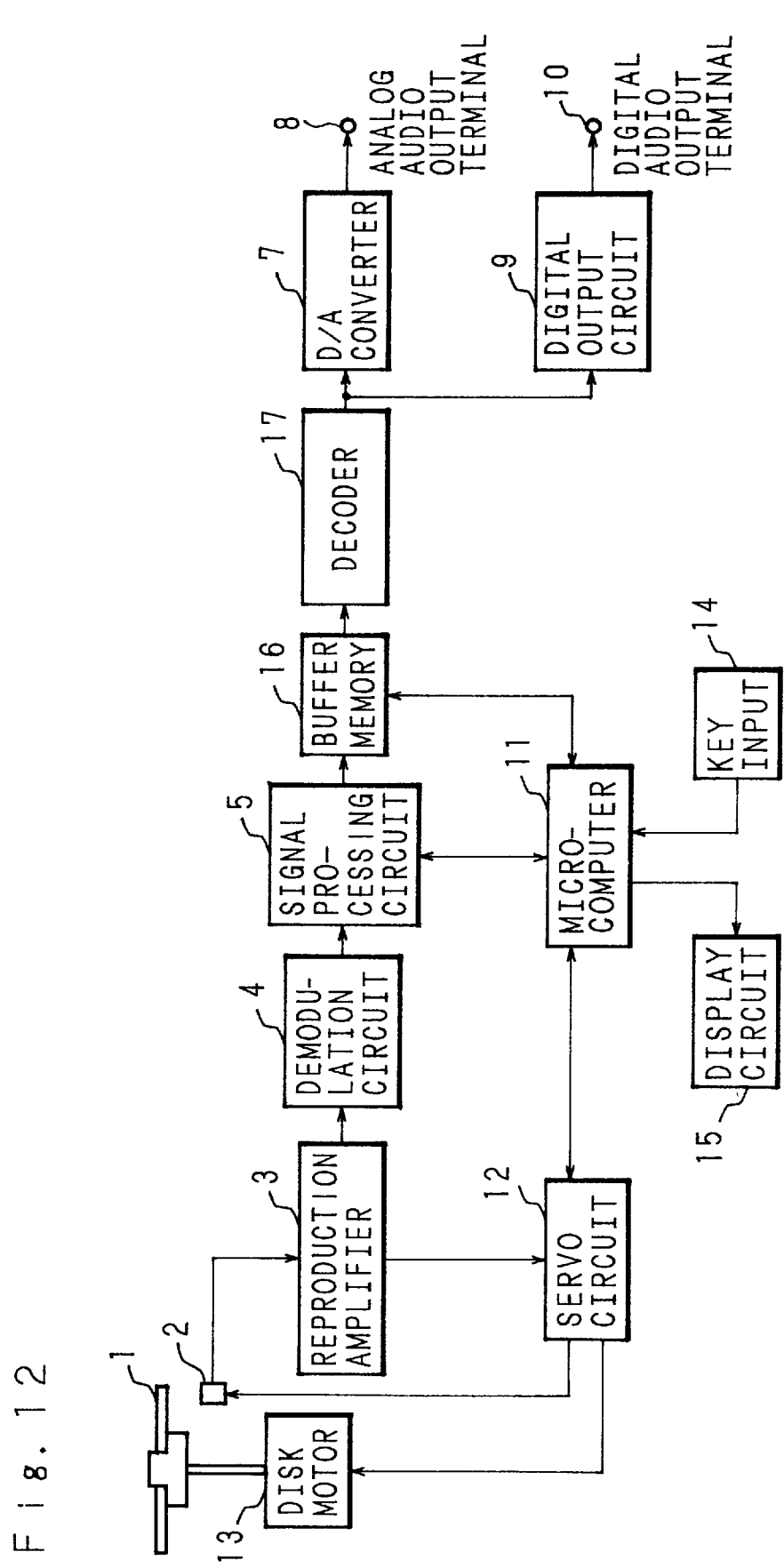
FIG. 12 shows a block circuit diagram of Embodiment 5 of the information reproduction apparatus of the invention.

FIG. 12 shows the construction of this embodiment. In FIG. 12, components identical with or equivalent to those previously illustrated are assigned the same numerals as previously, and description thereof will be omitted.

Now the operation will be described below. Processes for reading of the signals written on the disk 1 by means of the pickup 2, error correction for the train of signals in the signal processing circuit 5 to the de-interleaving process (wherein the train of signals the order of which was rearranged in the interleaving process is returned the original order) are the same as those in the prior art. The buffer memory 16 and the decoder 17 are used to temporarily store input data supplied intermittently, to decode the compressed data and to continuously provide the output of the original time series data, under the control of the microcomputer 11 as shown in FIG. 13. Namely, a train of signals entered in the memory 16 during the period from t0 to t1 in FIG. 13 is continuously outputted in the period from time t2 to t4. Similarly, trains of signals entered during periods from t2 to t3, from t4 to t5 and from t6 to t7 are continuously provided as outputs during periods from t4 to t6, from t6 to t8 and from t8 to t10. Periods from t1 to t2, from t5 to t6 and from t7 to t8 (hatched portions in the drawing) are periods wherein writing in the buffer memory 16 is disabled.

Signals restored into the original continuous time series, as described above, pass to the D/A converter 7 to be provided at the analog audio output terminal 8 as analog audio signals, while at the same time they pass to the digital output circuit 9 to be provided at the digital audio output terminal 10 as digital audio signals in conformity with the digital audio interface standard. The microcomputer 11 carries out various control tasks over the servo circuit 12, signal processing circuit 5, etc. based on the reproduced additional information and the key input 14, while at the same time displaying information such as the system operation mode and time on the display section 15.

In this embodiment, the mute period is further made shorter than that in Embodiment 2, while the disk stops before the reproduced signals end with the use of the buffer memory 16 as in Embodiment 2. FIGS. 14(a)–(e) show a timing chart at the end of the program. FIG. (a) shows the reproduction output of CD of the prior art, FIG. (b) shows the disk reading timing in Embodiment 2, FIG. (c) shows the reproduction output in Embodiment 2, FIG. (d) shows the disk reading timing in Embodiment 5 and FIG. (e) shows the reproduction output in Embodiment 5.

In the CD system of the prior art, reproduction of the program is finished at time t5 whereupon rotation of the disk is stopped and the disk is changed, then reproduction of the next disk is started at time t11 as shown in FIG. 14(a). Therefore no sound is produced during a period of k seconds which is taken to change the disk. In Embodiment 2 where the buffer memory 16 is used, however, reading from the disk 1 is finished at time t3 whereupon rotation of the disk 1 is stopped and disk change is started. Then, reading from the next disk 1 is started at time t6 under the control of the microcomputer 11 as shown in FIGS. 14 (b) and (c). In this case, because the reproduced signals are temporarily stored in the buffer memory 16, reproduction output of the continuous time series is continued until time t5 and reproduction output is restarted at time t9. Thus, the period without sound in this embodiment is reduced by h seconds, to become k–h seconds assuming that the time taken in disk change remains to be k seconds.

Further in Embodiment 5, an operation as described below is made possible. In this embodiment, when restarting reproduction of the disk 1 it is controlled by the microcomputer 11 so that data which has been read from the disk 1 first is immediately decoded and is outputted, and the second and the following reading operations are carried out as shown in FIGS. 14(d) and (e) wherein the second and following reading operations are similar to the prior art. In this case, the period without sound is further made shorter by i seconds than that in Embodiment 2. That is, as shown in FIGS. 14(d) and (e), data which has been read from the disk 1 in the period from time t6 to t7 is immediately decoded and is outputted in the period from t7 to t10, and data read in the period from time t7 to t8 is outputted after time t10. By this operation, period without sound is further reduced by i seconds to k–h–i seconds. The hatched portion in FIG. 14 represents the period without sound.

Embodiment 6

Figure 15:
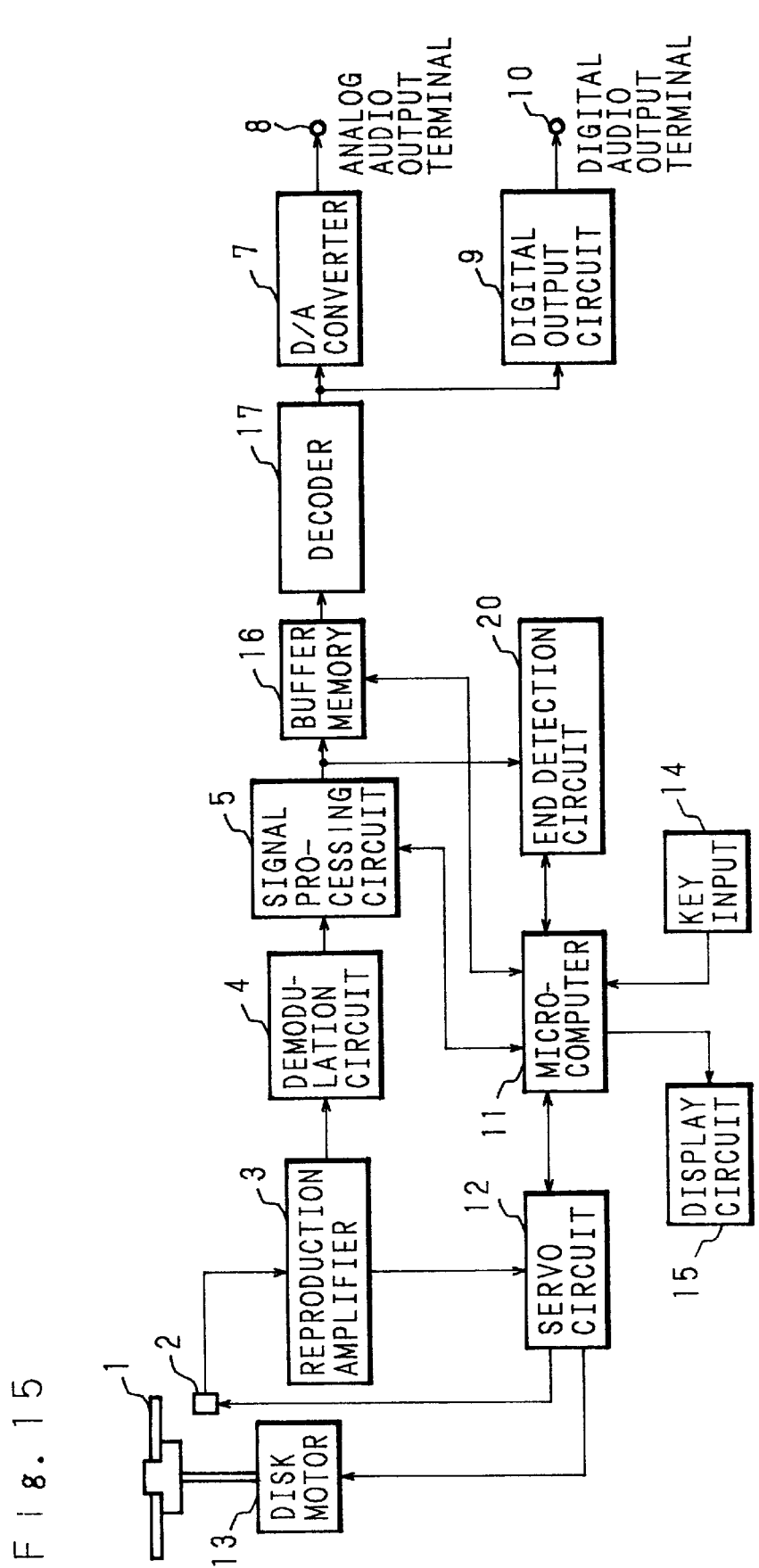
FIG. 15 shows a block circuit diagram of Embodiments 6 and 7 of the information reproduction apparatus of the invention.

FIG. 15 shows a block circuit diagram of Embodiment 6 of the information reproduction apparatus of the invention. Components identical with or equivalent to those of the prior art or previous embodiments are assigned the same numerals as previously, and description thereof will be omitted. In this embodiment, end detection circuit 20 similar to that of Embodiment 4 is added to the MD system which employs buffer memory to temporarily store compressed data.

Time series of digital audio signals restored into the original signals in the signal processing circuit 5 is fed to the end detection circuit 20. When the reproduced signal level decreases below the specified level within the end time of the program of one disk, the end detection circuit 20 determines that the program has come to an end.

FIG. 16 shows a timing chart when end of program is detected. In the drawing, (a) shows the reproduced signal level, (b) shows the reproduced output of CD of the prior art, (c) shows the timing of reading disk in Embodiment 6, (d) shows the reproduction output of Embodiment 6 and (e) shows the reproduction output of Embodiment 7.

It is already known from the reproduction time of a music piece recorded in the TOC information of a CD that the program will end at time t6, and a CD system of the prior art ends the reproduction of the program at time t6 stopping the disk 1 at this time, changing the disk, and then starting the reproduction of the next disk at time t11. As a result, no sound is produced for the k seconds which are taken in changing the disk (hatched portion Y), and signals with no sound or a very low sound level below the audible limit at the end of a program are reproduced for h seconds (hatched portion X), resulting in a mute period of h+k seconds.

However, in this embodiment which employs the buffer memory 16 and the end detection circuit 20, the reproduced signal level during specified period of q seconds before the program end time t6 is monitored and, in case no sound is produced or signals below the threshold level continue for the specified period of p seconds (p<q), namely from time t3 to t4, it is determined that no sound will be produced also in the remaining period from t4 to t6 and thereby reading of compressed signals from the disk 1 is interrupted at t2, thereupon rotation of the disk 1 is immediately stopped and disk change is started to restart reading from the next disk 1 at time t7. In this case, because the reproduced signals are temporarily stored in the buffer memory 16, reproduction output of the continuous time series is continued until time t5 and reproduction output is restarted at time t9; thus the period without sound in this embodiment is reduced by i seconds to become k+h–i seconds (assuming that the time taken in disk change remains to be k seconds). In FIGS. 16(b), 16(d) and 16(e) hatched portion X represents reproduction output which can be regarded as soundless, and the hatched portion Y represents a portion where soundless signals are reproduced due to disk change or the like.

Embodiment 7

Further as shown in FIG. 16(e), when restarting reproduction of the disk 1 if data which has been read from the disk 1 first is immediately decoded and is outputted, and the second and the following reading operations are carried out similarly to the prior art, then the period without sound is further made shorter by j seconds to become h+k–i–j seconds.

While reproduced signal level is used in the detection of signals without sound or with low-level audio signals in Embodiments 4 through 7, such signals may be judged by using, for example, a value representing the range of the reproduced signals such as scale factor.

Figure 17:
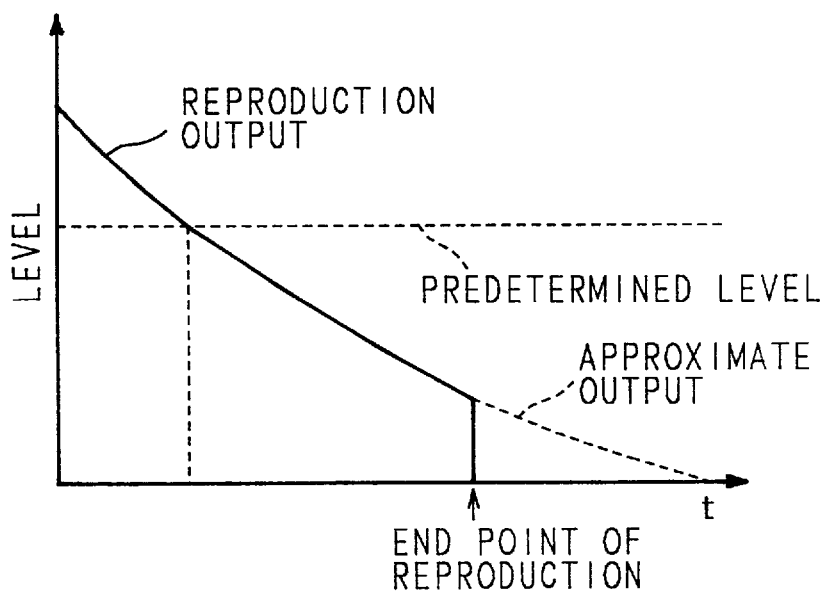
FIG. 17 is an approximate drawing illustrative of the output when interrupting the reproduction in the information reproduction apparatus of Embodiments 4 through 7.

Also, while the operation of reading from the disk 1 is interrupted when the reproduced signals become mute or below the audible limit in Embodiments 4 through 7, the threshold may be selected to set a desired level and, in this case, information that follows the interruption of reading from the disk 1 may be processed to obtain approximate reproduction signals for output so that noise is not generated as shown in FIG. 17.

Embodiment 8

Figure 18:
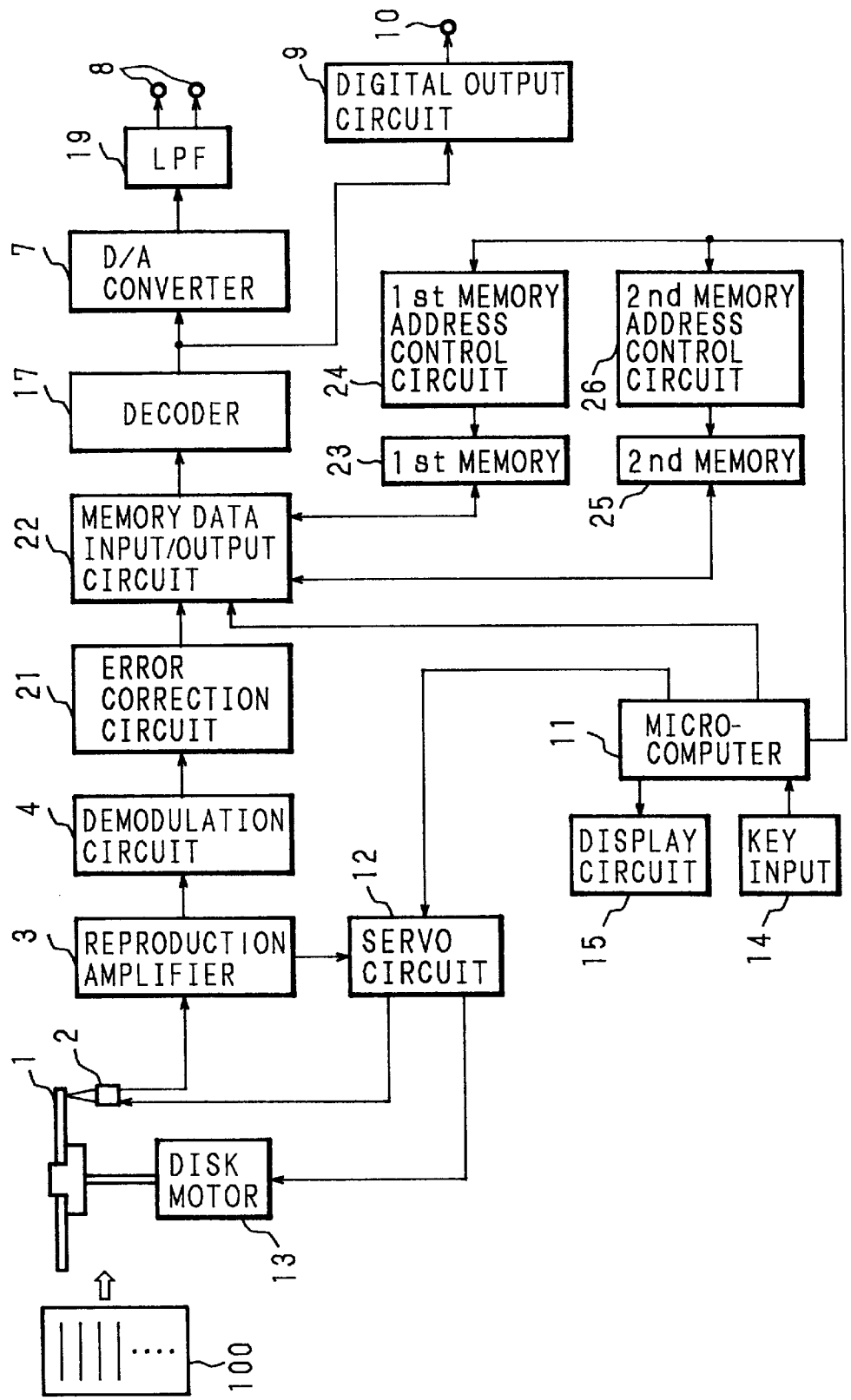
FIG. 18 shows a block circuit diagram of Embodiment 8 of the information reproduction apparatus of the invention.

FIG. 18 shows a block circuit diagram of Embodiment 8 of the information reproduction apparatus of the invention. In the drawing, components previously illustrated are assigned the same numeral as previously, and thus, description thereof will be omitted.

In the drawing, numeral 19 denotes a low-pass filter (LPF), numeral 21 denotes an error correction circuit, numeral 22 denotes a memory data input circuit, numeral 23 denotes a first memory, numeral 24 denotes an address control circuit for the first memory, numeral 25 denotes a second memory and numeral 26 denotes an address control circuit for the second memory.

Similar to the prior art, reproduced signals demodulated by the demodulator 4 are fed to the error correction circuit 21 for error detection and correction, then subjected to a deinterleave process to restore the order of interleaved signals into the original order. Regenerated signals which have passed this process are written into the first memory 23 under the control of the address control circuit 24 via the memory data input/output circuit 22. Regenerated signals which have been once stored in the memory 23 are read and supplied to the decoder 17 via the memory data input/output circuit 22.

Writing of signals into the first memory 23 is done at a rate faster than that of reading from the first memory 23. That is, signals of the disk 1 are read faster than the transfer speed of the output from the first memory 23, and consequently the amount of signals stored in the memory 23 increases. When the amount of signals stored in the memory 23 exceeds a specified level (overflow point) which has been set in advance, the memory data input/output circuit 22 stops the writing of signals in the memory 23. At the same time, the microcomputer 11 memorizes the position on the disk at this time and controls the servo control circuit 12 to repeat searching of the position. While this is done, reading of signals from the first memory 23 is continued at a constant rate and, when the amount of signals stored in the memory reaches a specified level (underflow point) which has been set in advance, the memory data input/output circuit 22 causes the writing of signals to be restarted. Thus signals of amount at least not less than the underflow point are maintained in the first memory 23. Therefore, even when the optical pickup 2 jumps to become unable to follow the specified track due to external disturbance so that writing of signals into the first memory 23 is disabled, reading of signals which have been stored is continued during which the reproduction point before the pickup jumped is searched and the optical pickup 2 is restored to the reproduction point, thereby enabling continued output from the first memory 23.

Figure 19:
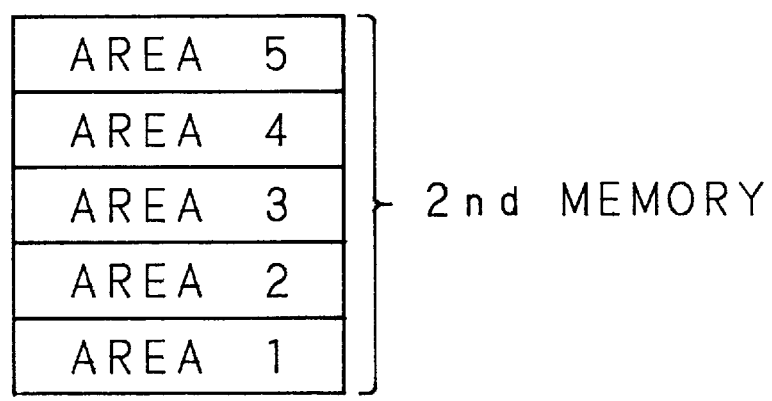
FIG. 19 shows a schematic diagram of the second memory of the information reproduction apparatus of Embodiments 8 and 9 of the invention.

When disks are loaded on this information reproduction apparatus, the microcomputer 11 directs the disk changer mechanism 100 to automatically take each of the disks from five disks successively, one at a time, and load it on the disk mechanism. Although the loaded disk 1 is reproduced similarly to the ordinary reproduction, what is reproduced is the specified period at the start of the first music piece, for example 10 seconds. While signals which are read by the optical pickup 2 at this time are sent through the signal path described above to the memory input/output circuit 22, they are stored in the second memory 25, not in the first memory 23. FIG. 19 shows a schematic diagram illustrative of the data stored in the second memory 25. Compressed signals of the first 10 seconds of the first music piece of each disk are stored in the areas 1 through 5 of the second memory 25. Correspondence between the disk numbers and the areas of the memory is controlled by the microcomputer 11.

Figure 20:
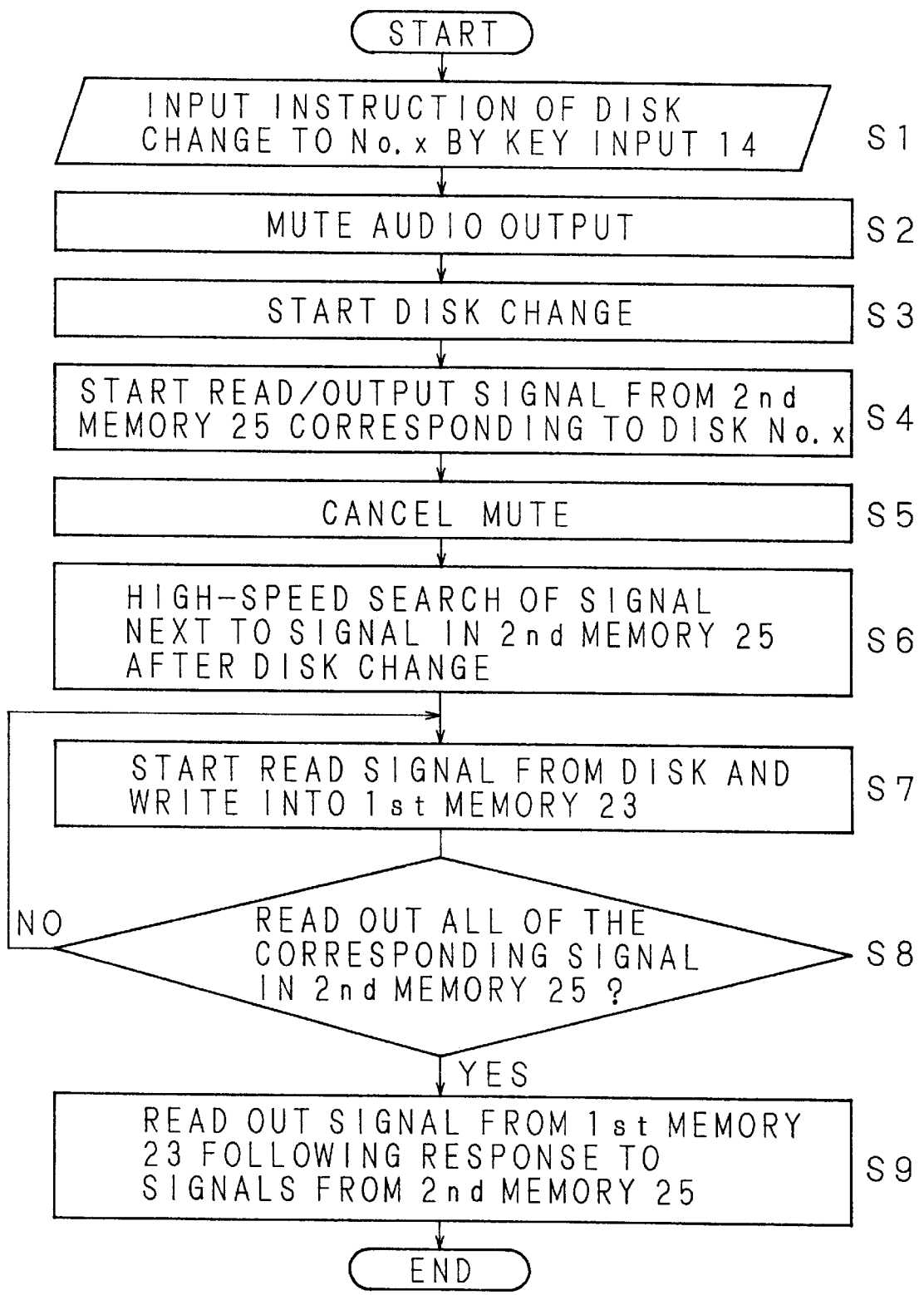
FIG. 20 shows a flow chart of the operation of the information reproduction apparatus of Embodiment 8.

Now the operation in case the user selects disk change during the reproduction of a disk will be described below. FIG. 20 shows a control flow chart, explanatory of the operation in this case. First, when a disk change command is entered by key input 14 (S1), the microcomputer 11 mutes the audio output from the disk being reproduced (S2) while at the same time stopping the disk rotation and commanding the changer mechanism 100 to change the disk, thereby to start disk change (S3). Then the microcomputer 11 commands the memory address control circuit 26 to read signals from the second memory 25 which correspond to the disk to be reproduced next, as designated by key input 14. The address control circuit 26 carries out the specified address control operation to select the signals of the first 10 seconds of the first music piece of the specified disk and reads the signals (S4). At this time the memory data input/output circuit 22 selects the signals in order that to send the signals read from the second memory 25, not from the first memory 23, to the decoder 17. The muting is canceled (S5), and signals restored by the decoder 17 are outputted via D/A converter 7 and the LPF 19 at the audio output terminals 8, and through the digital output circuit 9 at the digital audio output terminals 10.

At this time, because the signals outputted from the second memory 25 are compressed audio signals corresponding to a period of 10 seconds, audio signals of the first 10 seconds of the first music piece can be reproduced. During this period, the changer mechanism 100 changes the disk and, when the disk to be reproduced is loaded, signal position that follows the audio signals of the first 10 seconds of the first music piece is searched at a high speed (S6). That is, because the signals stored on the disk are provided with the address information recorded at the specified intervals, the microcomputer 11 memorizes the last address of the signals which have been input to the memory 25, and searches the next address that follows said address.

Then the optical pickup 2 reads the signals starting at the searched position, with the signals being stored in the first memory 23 similarly to the stationary reproduction operation described above (S7). Outputted also in this period are the signals stored in the second memory 25. After the last signal in the second memory 25 is outputted (S8), the memory input/output circuit 22 is switched to output the signals from the first memory 23 (S9), and the memory address control circuit 24 controls the memory address to successively read out the signals from the memory. Consequently, signals which have been stored in the memory 25 in advance are reproduced in the first 10 seconds, and signals read from the disk which follow the first 10 seconds can be reproduced without discontinuity.

Embodiment 9

Figure 21:
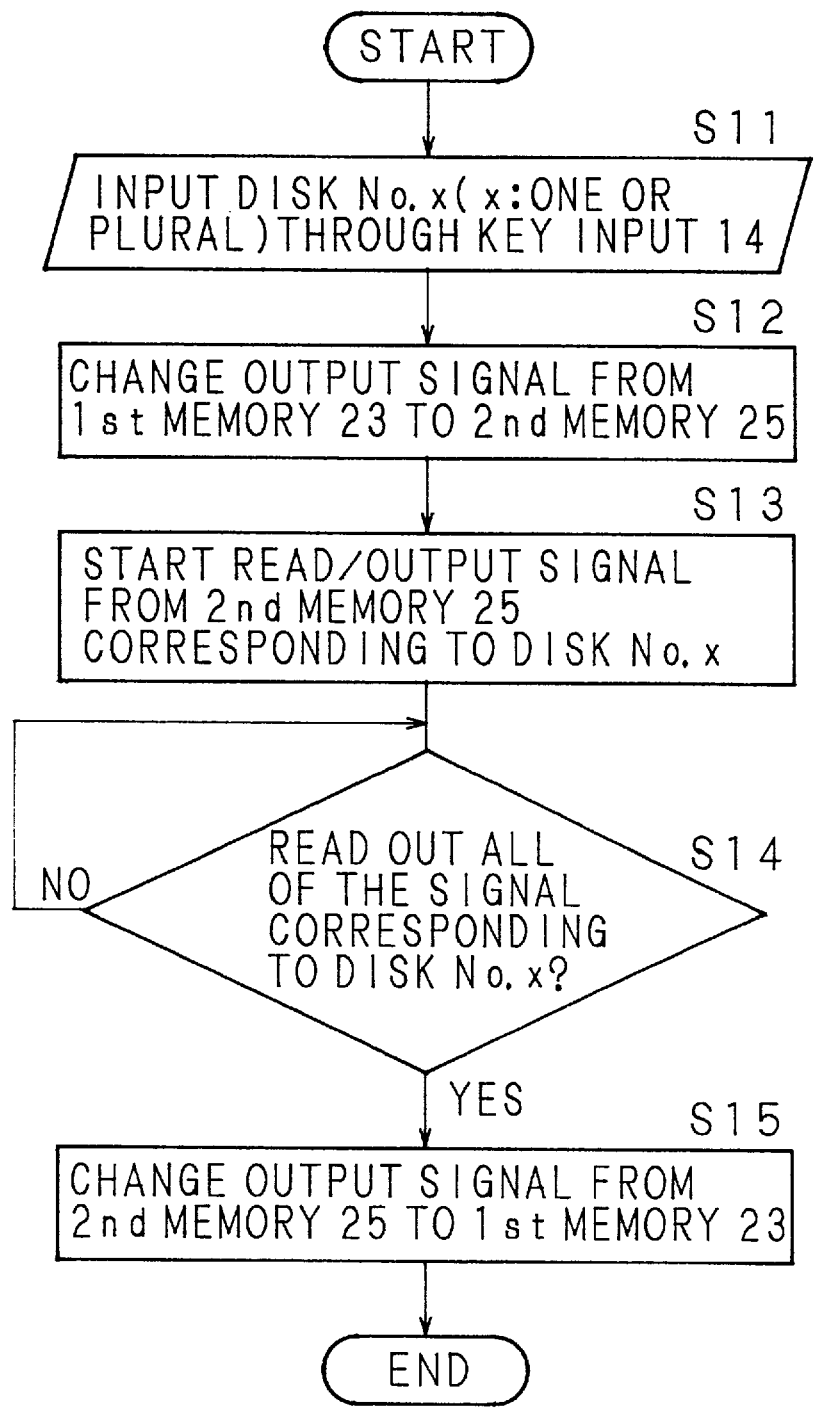
FIG. 21 shows a flow chart of the operation in Embodiment 9 of the information reproduction apparatus of the invention.

FIG. 21 shows a flow chart illustrative of the operation of the MD changer system. Block construction of the system is similar to that shown in FIG. 18. When disks are loaded, compressed signals of the first 10 seconds of the first music piece of each disk are stored in the areas 1 through 5 of the second memory 25, as described previously.

When the user wants to check the contents of another disk during reproduction of a disk, the user operates the corresponding key (S11) upon which the microcomputer 11 controls the system to read the signals from the corresponding area of the second memory 25. That is, for the memory data input/output circuit 22, output is switched from the signals stored in the first memory 23 to the signals stored in the second memory 25 (S12). For the second memory address control circuit 26, the microcomputer 11 commands it to read the signals from the area among the areas 1 through 5 corresponding to the key operation (S13). After sending the audio signals of the 10-second period as output (S14), reproduction of the disk which has been reproduced is continued (S15).

When the user wants to check the contents of all disks, the user operates the corresponding key, after which the microcomputer 11 controls the memory input/output circuit 22 to switch from the signals stored in the first memory 23 to the signals stored in the second memory 25. The microcomputer 11 also commands the memory address control circuit 26 to read signals from the areas 1 through 5 successively. The signals read according to the memory address from the memory address control circuit 26 are fed to the decoder 17 via the memory data input/output circuit 22 to restore digital audio signals. Therefore, signals of the first 10 seconds of the first music piece of each disk are successively reproduced as the audio output. In case skip of reproduction is commanded during reproduction of the 10-second period, the microcomputer 11 commands the second memory address control circuit 26 to jump to the first memory address in the area to be reproduced next, thereby enabling it to easily skip the reproduction.

Embodiment 10

Figure 22:
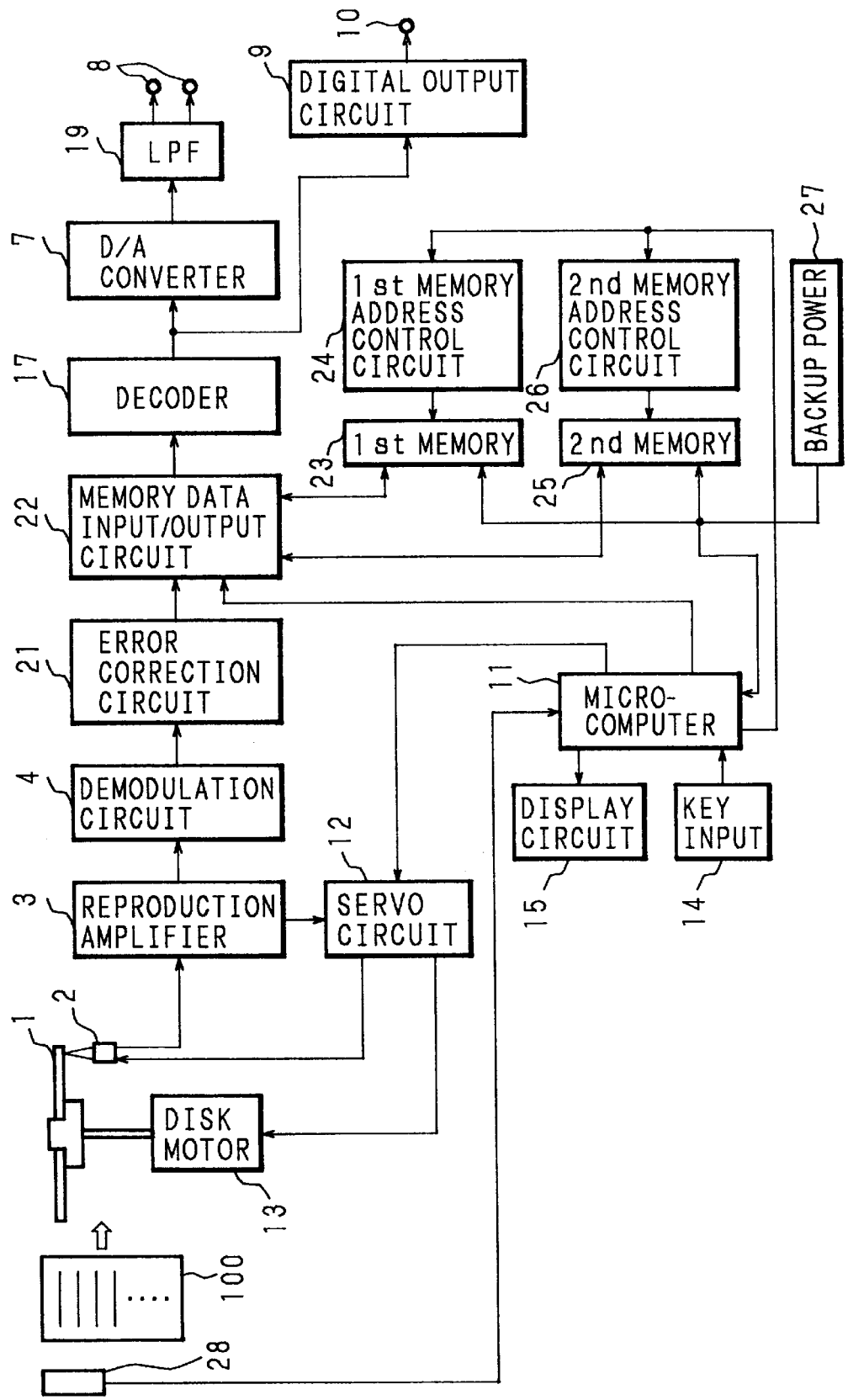
FIG. 22 shows a block circuit diagram of Embodiment 10 of the information reproduction apparatus of the invention.

FIG. 22 shows a block circuit diagram of Embodiment 10 of the information reproduction apparatus of the invention. Because reproduction of partial information of all disks requires a certain length of time, carrying out this operation every time the power is turned on forces the user to wait for a long time before reproduction is started. Therefore in Embodiment 10, the microcomputer 11 and the second memory 25 are backed up by the backup power supply 27 by utilizing the fact that the signals in the second memory 25 can be used as they are even when the power is once shut down, if the disk is not changed. And the changer mechanism 100 is provided with a disk detector switch 28 to sense the disk changing operation. Even when the main power (not shown in drawing) is shut down, the microcomputer 11 monitors whether the disk is changed or not by means of the disk detection switch 28. When a disk is changed, the microcomputer 11 controls the system so that a part of information of only the new disk is reproduced after the main power is turned on next time. Consequently, wait time of the user after turning on the main power can be eliminated when the disk is not changed, and wait time can be reduced when only a part of the disks are changed.

The apparatus of Embodiment 10 can be applied to Embodiments 8 and 9. Although the above description assume that the signals stored in the second memory 25 are those of the first 10 seconds of the first music piece of each disk, the signals may not be those of the first music piece, nor those of the first 10 seconds of any music piece but may instead be those of an arbitrary period in the midst of a music piece. However, in Embodiment 8, because disk change and position search are carried out while the signals from the second memory 25 are outputted, reproduced signals must be information of the first several seconds of each disk, and signals of a period of a certain length are required in order to obtain a sufficient effect of reducing the mute period.

Although the descriptions of Embodiments 8 through 10 assume that the first memory 23 and the second memory 25 are separate memories, it is apparent that the similar function can be realized by controlling the memory address by the use of the same memory. Further it is apparent that the control function of the invention can be realized with a scheme other than that of flow chart shown in FIG. 20 and FIG. 21.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A playback method for reproducing information from a plurality of recording media comprising the steps of:

pre-reproducing information from a limited portion of each of the plurality of recording media;

pre-storing the pre-reproduced information from the limited portion of each of the plurality of recording media in auxiliary memory;

determining which of the plurality of recording media has been selected for playback;

reading the pre-stored information from the auxiliary memory corresponding to the selected recording medium;

reproducing information from the selected recording medium which immediately follows the pre-stored information for that recording medium while pre-stored information from auxiliary memory is being read;

storing information resulting from said reproducing step in primary memory; and reading out reproduced information from primary memory after the pre-stored information for the selected medium has been read from auxiliary memory.

2. The method according to claim 1, wherein each recording medium is a compact disk, and the information stored thereon is audio data.

3. The method according to claim 2, wherein the amount of information pre-stored for each compact disk is a limited portion of an audio work.

4. The method according to claim 1, further comprising the steps of:

detecting, during playback from one medium, whether a selection has been made to switch playback to a second recording medium;

upon detecting a selection of a second recording medium, reading pre-stored information from auxiliary memory corresponding to the second recording medium;

reproducing information from the second recording medium which immediately follows the pre-stored information for the second recording medium stored in auxiliary memory while pre-stored information from auxiliary memory is being read;

storing information obtained during said reproducing step in primary memory; and reading out reproduced information from primary memory after the pre-stored information corresponding to the second medium has been read from auxiliary memory.

5. The method according to claim 1, wherein playback is performed using a playback system which has a main power supply and a back-up power supply, the back-up power supply providing power to the auxiliary memory when main power to the playback apparatus is shut off, and the supply of power from the back-up power supply to the auxiliary memory while main power is shut off enables the auxiliary memory to retain the pre-stored information from the limited portion of each of the plurality of recording media.

6. The method according to claim 5, wherein the plurality of recording media are stored in the playback system, and said method further comprises the steps of:

detecting when one of the plurality of recording media has been removed from the playback system and a new recording media has been inserted into the playback system;

pre-reproducing information from a limited portion of the newly inserted recording medium; and pre-storing the pre-reproduced information from the limited portion of the newly inserted recording medium in auxiliary memory, wherein, said detecting step is performed while main power to the playback system is shut off, and said step of pre-reproducing is performed when main power to the playback system is restored and said detecting step has determined that a new recording medium was inserted into the playback system while main power was shut off.

7. The method according to claim 1, wherein the plurality of recording media are stored in a playback system, and said method further comprises the steps of:

detecting when one of the plurality of recording media has been removed from the playback system and a new recording media has been inserted into the playback system;

pre-reproducing information from a limited portion of the newly inserted recording media; and pre-storing the pre-reproduced information from the limited portion of the newly inserted recording media in auxiliary memory.

8. The method according to claim 1, wherein, during a preview mode, the pre-stored information for each of the plurality of recording media is successively read from auxiliary memory.

9. An apparatus for playing back information from a plurality of recording media comprising:

first reproducing means for reproducing information from a limited portion of each of the plurality of recording media;

first storing means for storing the reproduced information from the limited portion of each of the plurality of recording media in auxiliary memory;

determining means for determining which of the plurality of recording media has been selected for playback;

first reading means for reading information from said auxiliary memory corresponding to the selected recording medium;

second reproducing means for reproducing information from the selected recording medium which immediately follows the information for that recording medium stored in auxiliary memory while said first reading means reads information from auxiliary memory;

second storing means for storing information obtained by said second reproducing means in primary memory; and second reading means for reading reproduced information from primary memory after the information stored in auxiliary memory for the selected medium has been read out by said first reading means.

10. The apparatus according to claim 9, wherein each recording medium is a compact disk, and the information stored thereon is audio data.

11. The apparatus according to claim 10, wherein the amount of information pre-stored for each compact disk is a limited portion of a single audio work.

12. The apparatus according to claim 9, further comprising:

detecting means for detecting, during playback from one medium, whether a selection has been made to switch playback to a second recording medium, wherein, when said detecting means determines that a second recording medium has been selected;

said first reading means reads information from auxiliary memory corresponding to the second recording medium, said second reproducing means reproduces information from the second recording medium which immediately follows the information for the second recording medium stored in auxiliary memory while said first reading means reads information from auxiliary memory corresponding to the selected medium, said second storing means stores information obtained by said second reproducing means in primary memory, and said second reading means reads information from primary memory after the information stored in auxiliary memory for the selected recording medium has been read out.

13. The apparatus according to claim 9, further comprising:

a main power supply for supplying power to said apparatus; and a back up power supply for providing power to auxiliary memory while said main power supply is shut off, wherein the supply of power from the back-up power supply to auxiliary memory while main power is shut off enables auxiliary memory to retain the information corresponding to a limited portion of each of the plurality of recording media.

14. The apparatus according to claim 13, wherein the plurality of recording media are stored in the playback apparatus, and said apparatus further comprises:

removal detecting means for detecting when one of the plurality of recording media has been removed from said playback apparatus and a new recording medium has been inserted into said playback apparatus, wherein, when said removal detecting means determines that a new recording medium has been inserted;

said first reproducing means reproduces information from a limited portion of the newly inserted recording medium, and said first storing means stores the reproduced information from the limited portion of the newly inserted recording medium in auxiliary memory, and wherein said removal detecting means operates while said main power supply is shut off, and said first reproducing means operates once the main power is restored when said removal detecting means determines that a new recording medium had been inserted into said playback apparatus while said main power supply was shut off.

15. The apparatus according to claim 9, wherein the plurality of recording media are stored in said playback apparatus, and said apparatus further comprises:

removal detecting means for detecting when one of the plurality of recording media has been removed from the playback apparatus and a new recording media has been inserted into the playback apparatus, wherein said first reproducing means reproduces information from a limited portion of the newly inserted recording media, and said first storing means stores the reproduced information from the limited portion of the newly inserted recording media in auxiliary memory.

16. The apparatus according to claim 9, wherein, during a preview mode, said first reading means successively reads pre-stored information for each of the plurality of recording media from auxiliary memory.

* * * * *